(12) United States Patent
Sugaya et al.

(10) Patent No.: US 6,288,834 B1
(45) Date of Patent: Sep. 11, 2001

(54) OPTICAL AMPLIFIER FOR AMPLIFYING LIGHT IN A LONG WAVELENGTH BAND

(75) Inventors: Yasushi Sugaya; Susumu Kinoshita; Hiroshi Onaka, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/334,622

(22) Filed: Jun. 17, 1999

(30) Foreign Application Priority Data

Jun. 18, 1998 (JP) .................................................. 10-171828

(51) Int. Cl.$^7$ ........................................................ H01S 3/00
(52) U.S. Cl. ...................... 359/341.1; 359/341.1
(58) Field of Search ................................ 359/341, 341.1, 359/341.3

(56) References Cited

U.S. PATENT DOCUMENTS 5,500,764  3/1996  Armitage et al. .
6,041,070 * 3/2000  Koch et al. ........................ 372/6

OTHER PUBLICATIONS

McGraw–Hill Encyclopedia of Science & Technology, vol. 9, pp. 606–607, 7th Edition (1992).
"Optical Amplifiers and their Applications," edited by S. Shimado and H. Ishio, p. 97 (1994).
"Gain Flattened Er$^{3+}$ Doped Fiber Amplifier for a WDM Signal In the 1.57–1.60 $\mu$m Wavelength Region," Ono et al., IEEE Photon. Tech. Lett., vol. 9, pp. 596–598 (May 1997).
"Amplification Characteristics of 1.58 $\mu$m Band Er$^{3+}$ Doped Fiber Amplifiers," Ono et al., Technical Report of IEICE, vol. OCS97-5, pp.25–30 (May 1997) (with English translation of Abstract only).

"Low Noise Operation of Er$^{3+}$ Doped Silica Fibre Amplifier around 1.6 $\mu$m," Massicott et al., Electron. Lett., vol. 28, pp. 1924–1925 (Sep. 1992).

* cited by examiner

Primary Examiner—Mark Hellner
(74) Attorney, Agent, or Firm—Staas & Halsey, LLP

(57) ABSTRACT

An optical amplifier for amplifying light in a longer wavelength band. The optical amplifier includes first and second optical fibers doped with a rare earth element and optically connected so that a signal light travels through the first optical fiber and then through the second optical fiber. Excitation light causes the signal light to be amplified in both the first and second optical fibers. Spontaneous emission lights are generated in the first optical fiber. An oscillation generator causes the spontaneous emission lights to oscillate in the first optical fiber, to thereby generate laser oscillation. Light generated by the laser oscillation is supplied to the second optical fiber as excitation light in the second optical fiber. The oscillation generator can be formed by fiber gratings along the first optical fiber and which reflect spontaneous emission light at a predetermined wavelength, thereby causing spontaneous emission lights to oscillate between the fiber gratings in the first optical fiber. Alternatively, the oscillation generator can be a traveling-wave type optical oscillator. In an additional embodiment, an optical amplifier includes first and second optical amplifiers amplifying first and second signal lights, respectively, the first and second signal lights being in different wavelength bands. An excitation light providing device branches a portion of the signal light amplified by the first optical amplifier, and provides the branched portion to the second optical amplifier as excitation light in the second optical amplifier.

48 Claims, 9 Drawing Sheets

OPTICAL AMPLIFIER FOR AMPLIFYING LIGHT IN A LONG WAVELENGTH BAND

CROSS-REFERENCE TO RELATED APPLICATIONS

This application is based on, and claims priority to, Japanese application number 10-171828, filed Jun. 18, 1998, in Japan, and which is incorporated herein by reference.

BACKGROUND OF THE INVENTION

1. Field of the Invention

The present invention relates to an optical amplifier and method for amplifying optical signal light using an optical fiber doped with a rare earth element, and especially for amplifying optical signal light in a long wavelength band.

2. Description of the Related Art

With the advancing development of multimedia networks, demand for information is drastically increasing. Therefore, trunk optical transmission systems, which have relatively high information transmission capacity, will be required to have even higher information transmission capacity and will be required to form flexible networks.

To provide higher transmission capacity, wavelength division multiplexing (WDM) optical transmission systems are being used. The commercialization of WDM optical transmission systems has already been advanced mainly in North America.

Moreover, WDM optical amplifiers have been used to amplify WDM optical signals. A WDM optical amplifier can collectively amplify signal lights having two or more different wavelengths in, for example, a wavelength range of 1.53 to 1.57 $\mu$m (hereinafter referred to as the "conventional band"). Therefore, the use of WDM optical amplifiers in a WDM optical transmission system can enable high-capacity, long-distance optical transmission with a relatively simple configuration.

Furthermore, by expanding the wavelength band of an optical amplifier, a system has been proposed which employs a long wavelength band, for example, of 1.57 to 1.62 $\mu$m (hereinafter referred to as the "longer wavelength band"), as a new transmission band.

The following is a description of the use of an optical amplifier employing an erbium doped fiber (EDF) for the amplification of signal light in the longer wavelength band.

FIG. 1 is a graph showing the gain per unit length versus wavelength characteristics of an EDF corresponding to the degrees of population inversion (ranging from 0.0 to 1.0). As shown in FIG. 1, in the conventional band, the gain characteristic of an EDF is flat in the case that the degree of population inversion is 70% or so. Namely, the gain of an EDF in the conventional band is dominant.

Conversely, in the longer wavelength band, the gain characteristic of an EDF is flat in the case that the degree of population inversion is low, namely, 40% or so. Thus, the gain of an EDF in the longer wavelength band is dominant. Therefore, in the case of optical amplification of signal light in the longer wavelength band, an excitation light of a wavelength in a 0.98 $\mu$m band or a 1.48 $\mu$m band is supplied to the EDF by setting the degree of population inversion at a low level. In this case, the amplification factor per unit length of the EDF decreases in principle because of the low degree of population inversion.

In the forward excitation case of supplying the excitation light from a signal light input terminal of the EDIF to a signal output terminal thereof, the degree of population inversion corresponds to the excitation light power. Therefore, the degree of population inversion is high at the signal light input terminal, but is low at the signal light output terminal. In the backward excitation case of supplying an excitation light from the signal light output terminal of the EDF to the signal input terminal thereof, there is a relation between the degrees of population inversion at the signal input and output terminals thereof opposite to that of the forward excitation case.

Thus, generally, a required total gain of the EDF in the case of the optical amplification of signal light in the longer wavelength band is obtained by elongating a conventional EDF used for the optical amplification of signal light of the conventional band, to thereby lower the degree of population inversion. This can be understood by referring to FIG. 2, which illustrates gain distribution in the longitudinal direction of an EDF.

Further, when the degree of population inversion is set at a low level, the absorption of excitation light is increased. For example, if the wavelength of the excitation light is in the 1.48 $\mu$m band in FIG. 1, the gain per unit length of the EDF is about −0.2 dB when the degree of population inversion is 0.4. This indicates that, in such a case, the excitation light is more likely to be absorbed in the EDF, as compared with the case where the gain per unit length thereof is about 0 dB when the degree of population inversion is 0.7. When the excitation light is largely absorbed therein, the absorption of excitation light is performed at a biased position in the EDF. Consequently, the excitation power propagation efficiency in the longitudinal direction of the EDF is reduced. Thus, the optical amplification of signal light in the longer wavelength band has a feature that the excitation efficiency of the entire EDF is limited to a low value in comparison with that of the entire EDF in the case of the optical amplification of signal light in the conventional band. A conventional optical amplifier for amplifying signal light of a long wavelength band having such a feature is described in, for example, the article titled "Gain Flattened Er$^{3+}$ Doped Fiber Amplifier for a WDM Signal in the 1.57–1.60 $\mu$m Wavelength Region," Ono et al., IEEE Photon. Tech. Lett., Vol. 9, pp. 596–598, May, 1997.

FIG. 3 is a diagram showing such a conventional long wavelength band optical amplifier. In the optical amplifier of FIG. 3, an incident longer wavelength band signal light $L_s$ passes through an optical isolator $2_1$ and is multiplexed with an excitation light $Lp_1$, emitted from an excitation light source $4_1$ by a wavelength division multiplexing (WDM) coupler $3_1$. Then, the multiplexed light enters an EDF 1. An excitation light $Lp_2$ is emitted from an excitation light source $4_2$. At an emitting terminal of EDF 1, excitation light $Lp_2$ is multiplexed by a WDM coupler $3_2$ and is then propagated through EDF 1 in the opposite direction than excitation light $Lp_1$, thereby contributing to optical amplification. The longer wavelength band signal light $L_s$ passes through WDM coupler $3_2$ and optical isolator $2_2$ after passing through EDF 1. Then, signal light $L_s$ is emitted from the amplifier.

FIG. 4 is a diagram showing another conventional long wavelength band optical amplifier. Such a long wavelength band optical amplifier is described, for example, in the article titled "Amplification Characteristics of 1.58 $\mu$m Band Er$^{3+}$ Doped Fiber Amplifier," Ono et al., TECHNICAL REPORT OF IEICE, Vol. OCS97-5, pp. 25–30, 1997.

In the optical amplifier of FIG. 4, an incident longer wavelength band signal light $L_s$ passes through an optical isolator $2_1$. A forward excitation light $Lp_1$ is emitted from an excitation light source $4_1$. Signal light $L_s$ and excitation light $Lp_1$ are multiplexed by a WDM coupler $3_1$. Then, the multiplexed light enters a pre-stage EDF $1_1$. After passing through pre-stage EDF $1_1$, the longer wavelength band signal light $L_s$ passes through an optical isolator $2_3$ and enters a post-stage EDF $1_2$. Further, a backward excitation light $Lp_2$ is emitted from an excitation light source $4_2$. Excitation light $Lp_2$ enter post-stage EDF $1_2$ through a WDM coupler $3_2$. Excitation light $Lp_2$ propagates through post-stage EDF $1_2$ in the opposite direction than excitation light $Lp_1$, and thereby contributes to the optical amplification by the post-stage portion. Then, the longer wavelength band signal light $L_s$ passes through WDM coupler $3_2$ and an optical isolator $2_2$ after passing through post-stage EDF $1_2$. Finally, signal light $L_s$ reaches the emitting terminal of the amplifier. In this case, one of wavelengths (ranging from 960 to 1000 nm) in the 0.98 μm band is used as that of the forward excitation light $Lp_1$. Moreover, one of wavelengths (ranging from 1450 to 1490 nm) in the 1.48 μm band is used as that of the backward excitation light $Lp_2$. With this configuration, a low noise optical amplifier is realized.

FIG. 5 is a diagram showing another conventional long wavelength band optical amplifier. Conventional long wavelength band optical amplifiers, such as that in FIG. 5, are described, for example, in the article titled "Low Noise Operation of $Er^{3+}$ Doped Silica Fiber Amplifier around 1.6 μm," Massicott et al., Electron. Lett., Vol. 28, pp. 1924–1925, September 1992, and U.S. Pat. No. 5,500,764 Official Gazette.

In the optical amplifier of FIG. 5, an incident longer wavelength band signal light $L_s$ is multiplexed with conventional band signal light $Lp_3$ through a multiplexer 5, passes through an isolator $2_1$, and is then multiplexed at a WDM coupler $3_1$ with an excitation light $Lp_1$ emitted from an excitation light source $4_1$. Then, the multiplexed signal light $L_s$ enters in EDF 1. At an emitting terminal of EDF 1, an excitation light $Lp_2$ emitted from an excitation light source $4_2$ is multiplexed at a WDM coupler $3_2$. Excitation light $Lp_2$ propagates through EDF 1 in the opposite direction than excitation light $Lp_1$, and thereby contributes to amplification. The longer wavelength band signal light $L_s$ passes through WDM coupler $3_2$ and an optical isolator $2_2$ after passing through EDF 1. Finally, signal light $L_s$ reaches the emitting terminal of the amplifier. This optical amplifier improves the excitation efficiency by adding the conventional band signal light $Lp_3$ to the signal light $L_s$ at a low level. Namely, the more the excitation light having a wavelength close to that of signal light is used, the higher the excitation efficiency. Therefore, the conventional band light is used as excitation light for amplifying the longer wavelength band signal light.

However, the conversion efficiency of the conventional amplifier in FIG. 3 is only 37.7% or so when the gain flattens in the case that the wavelength of the excitation light is set at, for example, one of wavelengths of 1450 to 1490 nm. Therefore, this conventional optical amplifier has a problem that properties, such as excitation efficiency and noise factor, are inferior to those in the case of optical amplification of signal light of the conventional band.

To cope with this problem, the conventional optical amplifier in FIG. 4 reduces the length of pre-stage EDF $1_1$, increases the length of post-stage EDF $1_2$ and uses the 0.98 μm band excitation light, which has good noise characteristics, for the pre-stage portion amplification. Thus, the noise level in the case of this conventional optical amplifier is low, as compared with the optical amplifier of FIG. 3.

However, although the optical amplifier in FIG. 4 is effective in reducing noise, this optical amplifier has problems in that the excitation power transmission efficiency is low and that the excitation efficiency is still low.

In contrast, the optical amplifier in FIG. 5 obtains high excitation efficiency by supplying the conventional band light $Lp_3$ to EDF 1, and reduces the energy consumption thereof. However, this conventional optical amplifier has problems in that an additional light source for generating the conventional band light is required and that active optical parts, such as a light source, are expensive and thus the cost of the amplifier is increased.

SUMMARY OF THE INVENTION

Accordingly, it is an object of the present invention to provide a low-cost optical amplifier and optical amplification method which realize high excitation efficiency optical amplification of signal light of new bands, such as the longer wavelength band, by adding only passive optical parts to a conventional doped fiber optical amplifier.

Additional objects and advantages of the invention will be set forth in part in the description which follows, and, in part, will be obvious from the description, or may be learned by practice of the invention.

Objects of the present invention are achieved by providing an optical amplifier for amplifying signal light of a predetermined wavelength band. The amplifier includes first and second rare earth element doped fibers cascaded together so that signal light travels through the first rare earth element doped fiber and then through the second rare earth element doped fiber. At least one excitation light source generates excitation light, and at least one excitation light supplying device supplies the excitation light from the excitation light source to the first rare earth element doped fiber. A laser oscillation light generating device laser oscillates spontaneous emission light of a predetermined wavelength band among spontaneous emission lights generated in the first rare earth element doped fiber, so that laser oscillation is generated. The laser oscillation light generating device then supplies light generated by the laser oscillation to the second rare earth element doped fiber as an excitation light.

With such an optical amplifier, when a signal light of a predetermined wavelength band, for example, the longer wavelength band, enters this optical amplifier, the signal light is sent to the first rare earth element doped fiber doped with, for example, erbium. An excitation light output from the excitation light source is supplied to this first rare earth element doped fiber through the excitation light supplying device. Then, a spontaneous emission light is generated, and the signal light is amplified. The laser oscillation light generating device oscillates a light of the predetermined wavelength band, for example, the conventional band, among the generated spontaneous emission lights, so that laser oscillation is generated. Subsequently, the light generated by the laser oscillation is supplied to the second rare earth element doped fiber.

The signal light having passed through the first rare earth element doped fiber enters in the second rare earth element doped fiber. Light generated by the laser oscillation serves as an excitation light in the second rare earth element doped fiber. Thus, the signal light is amplified with high excitation efficiency.

Consequently, the high excitation efficiency amplification of signal light of the longer wavelength band is achieved without adding active optical parts, such as a light source, differently from the aforementioned conventional long wavelength band optical amplifiers. Moreover, the cost of the optical amplifier is reduced.

The laser oscillation light generating device may be, for example, a fiber resonator type device or a traveling-wave type optical oscillator. In the case that the laser oscillation light generating device is the fiber resonator type device, the laser oscillation light generating device includes a pair of wavelength selective reflection type optical devices, one at each end of the first rare earth element doped fiber, which can reflect the spontaneous emission light of the predetermined wavelength band and transmit the signal light and the excitation light. With such a configuration, the spontaneous emission light of the predetermined wavelength band generated in the first rare earth element doped fiber is reflected by the wavelength selective reflection type optical devices to resonate, so that laser oscillation occurs in the first rare earth element doped fiber.

In the case that the laser oscillation light generating device is a traveling-wave type optical oscillator, the laser oscillation light generating device has a branching portion for branching a part of light emitted from the signal light emitting terminal of the first rare earth element doped fiber, and a wavelength selection portion for receiving the branched light from the branching portion and for selecting and emitting only a spontaneous emission light of the predetermined wavelength band. Moreover, the laser oscillation light generating device has a multiplexing portion for entering a light emitted from the wavelength selection portion, in a signal light incidence terminal of the first rare earth element doped fiber.

With this configuration, a part of light emitted from the first rare earth element doped fiber is branched at the branching portion. A spontaneous emission light of the predetermined wavelength band included in the branched light is selected by the wavelength selection portion and is then sent to the signal light incidence terminal of the first rare earth element doped fiber through the multiplexing portion. Thus, the spontaneous emission light of the predetermined wavelength band becomes traveling waves. Consequently, laser oscillation occurs.

The optical amplifier may be a forward excitation type device in which the excitation light supplying device is placed at the signal light incidence terminal side of the first rare earth element doped fiber. Alternatively, the optical amplifier may be a bi-directional excitation type device in which excitation light supplying devices are placed at the signal light incidence terminal side of the first rare earth element doped fiber and at the signal light emission terminal side of the second rare earth element doped fiber, respectively.

Moreover, it is preferable that the optical amplifier of the present invention has an excitation light reflecting device for reflecting the excitation light and for transmitting the signal light. Practically, in the case that the optical amplifier of the present invention is of the forward excitation type, the excitation light reflecting device is provided at the signal light emission side of the second rare earth element doped fiber. In the case that the optical amplifier of the present invention is of the bi-directional excitation type, the excitation light reflecting device is provided between the first and second rare earth element doped fibers.

As a result of providing the excitation light reflecting device in the optical amplifier of the present invention, the excitation light emitted from the excitation light source is propagated reciprocatingly through the first and second rare earth element doped fibers, so that the conversion efficiency of the excitation is enhanced. Consequently, the present invention provides high excitation efficiency optical amplifier.

Furthermore, in the case of the optical amplifiers of the forward excitation type and the bi-directional excitation type, it is preferable that a third rare earth element doped fiber be cascaded with the signal light incidence terminal side of the first rare earth element doped fiber. In the optical amplifier of such a configuration, an incident signal light is first sent to the third rare earth element doped fiber. Then, the third rare earth element doped fiber is supplied with a forward excitation light of relatively high power and thus amplifies a signal light at a high degree of population inversion. Then, the signal light and excitation light having passed through the third rare earth element doped fiber are sent to the first rare earth element doped fiber. Thus, the signal light is amplified.

Moreover, the laser oscillation of spontaneous emission light of a predetermined wavelength band occurs. Then, the laser oscillation light and the signal light enter the second rare earth element doped fiber, so that the signal light is more greatly amplified. Consequently, the low level signal light is effectively amplified at the pre-stage portion. Thus, noise is reduced in the entire optical amplifier.

Further, preferably, the optical amplifier has a light intercepting device provided between the first and third rare earth element doped fibers for intercepting a light being propagated from the first rare earth element doped fiber to the third rare earth element doped fiber.

When among spontaneous emission light generated in the first rare earth element doped fiber, a component being propagated in a direction opposite to the direction of propagation of the signal light enters in the third rare earth element doped fiber, the signal-light gain of the third rare earth element doped fiber decreases. Thus, the population inversion in the third rare earth element doped fiber, namely, the gain thereof, is maintained at a high level by using the light intercepting device to intercept the spontaneous emission light propagating in a direction opposite to the direction of this signal light. Consequently, the noise characteristics of the entire optical amplifier are further improved.

According to another aspect of the present invention, there is provided an optical amplifier for amplifying a signal light of a first wavelength band and a signal light of a second wavelength band. The amplifier includes a first optical amplifying device for amplifying the signal light of the first wavelength band by using a rare earth element doped fiber, a second optical amplifying device for amplifying the signal light of the second wavelength band by using a rare earth element doped fiber, a light branching device for branching a part of the signal light amplified by the first optical amplifying device, and a branch light supplying device for supplying a branch light from the light branching device to the second optical amplifying device as an excitation light. With such a configuration, when a signal light of a first wavelength band, such as the conventional band, and a signal light of a second wavelength band, such as the longer wavelength band, are amplified by using a rare earth element doped fiber, a part of signal light of the conventional band amplified by the first optical amplifying device is branched by the light branching device and is then supplied to the second optical amplifying device through the branch light supplying device. This branch light sent from the first optical amplifying device serves as an excitation light for the second optical amplifying device. Thus, the signal light of the longer wavelength band is amplified with high excitation efficiency. Consequently, the present invention provides an optical amplifier having excellent amplification characteristics at a low cost.

According to still another aspect of the present invention, there is provided an optical amplification method for amplifying a signal light of a predetermined wavelength band by using a rare earth element doped fiber. The method includes (a) oscillating a spontaneous emission light of a predetermined wavelength band among spontaneous emission lights generated in the rare earth element doped fiber, so that laser oscillation is generated and (b) amplifying the signal light of the predetermined wavelength band by supplying light generated by the laser oscillation to a rare earth element doped fiber as an excitation light.

According to yet another aspect of the present invention, there is provided an optical amplification method for amplifying a signal light of a first wavelength band and a signal light of a second wavelength band by first and second amplifying devices, respectively, each of which uses a rare earth element doped fiber. The method includes (a) branching a part of signal light amplified by the first optical amplifying device, and (b) supplying the branched part to the second optical amplifying device as an excitation light.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
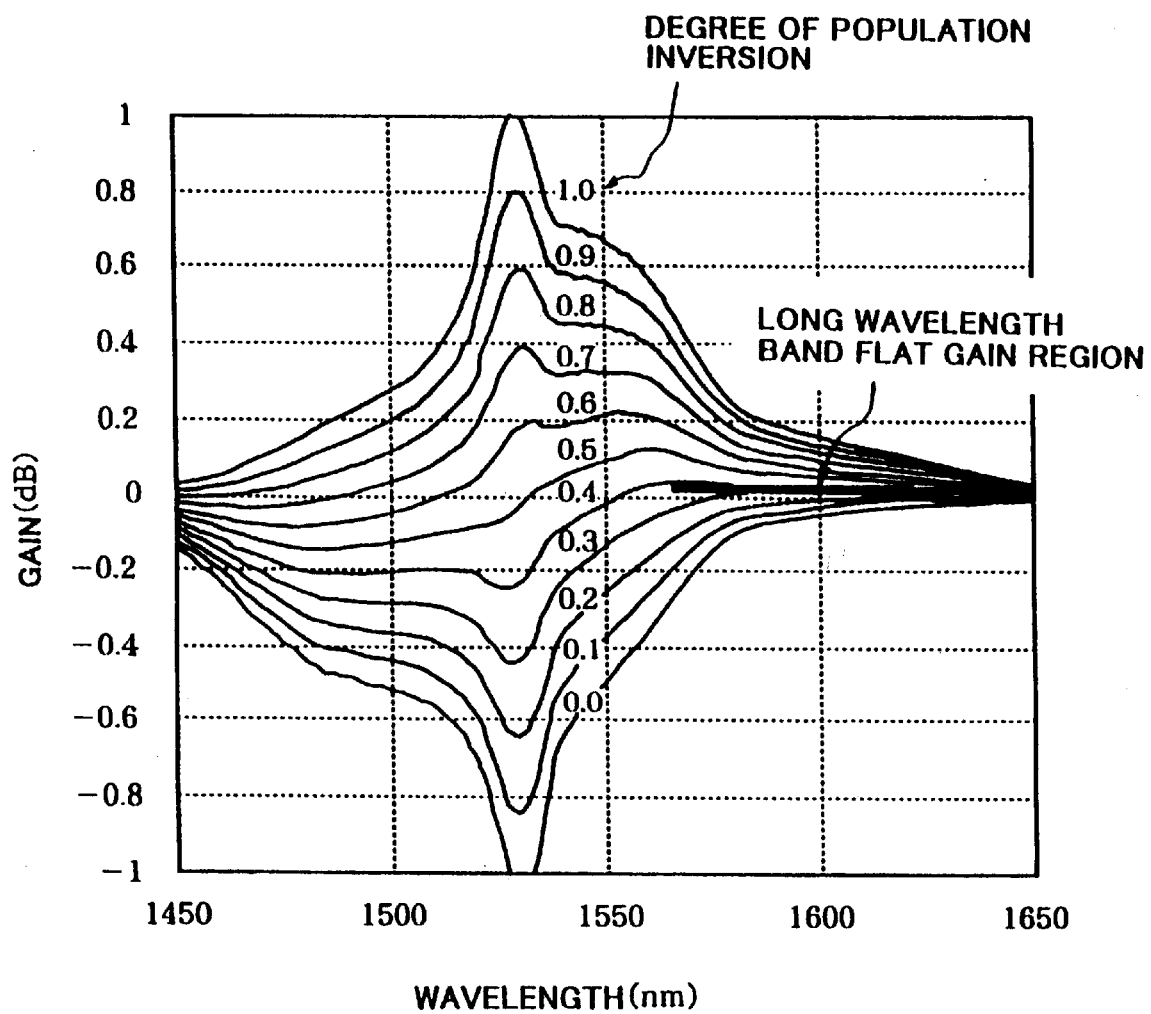
FIG. 1 (prior art) is a graph showing the gain per unit length versus wavelength characteristics of an EDF corresponding to the degrees of population inversion.
Figure 2:
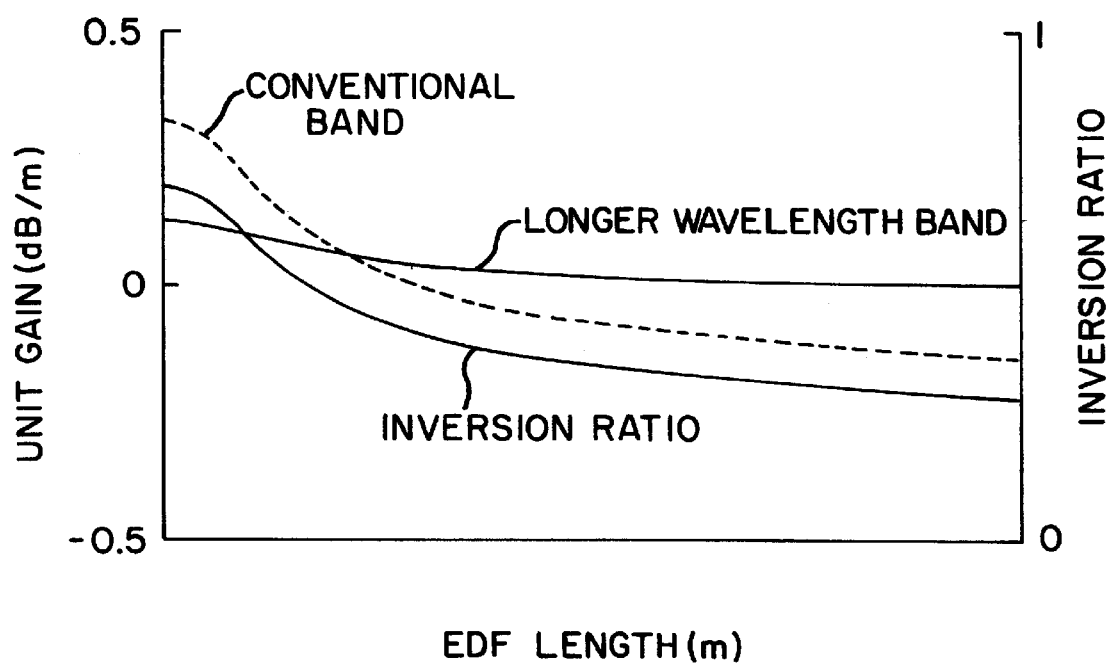
FIG. 2 (prior art) is a graph illustrating gain distribution in the longitudinal direction of an EDF.

Reference will now be made in detail to the present preferred embodiments of the present invention, examples of which are illustrated in the accompanying drawings, wherein like reference numerals refer to like elements throughout.

Figure 6:
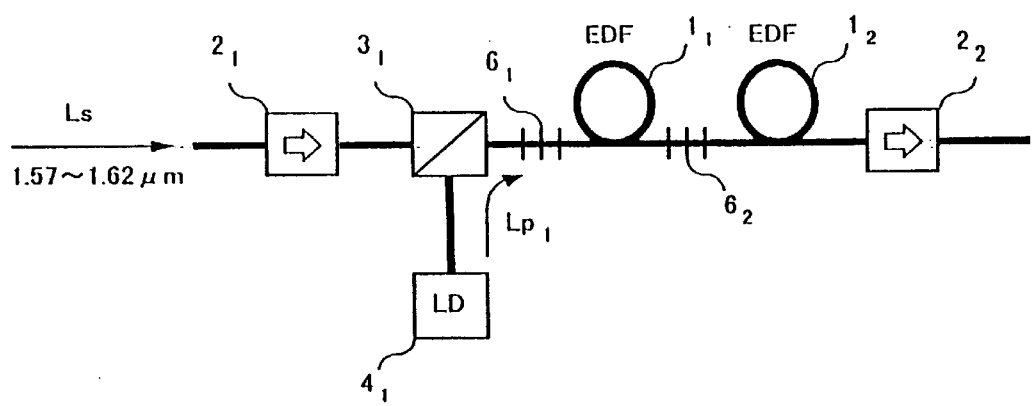
FIG. 6 is a diagram showing an optical amplifier, according to an embodiment of the present invention.

FIG. 6 is a diagram showing an optical amplifier, according to an embodiment of the present invention. As shown in FIG. 6, a signal light $L_s$ of the longer wavelength band enters and passes through an optical isolator $2_1$. An excitation light source (LD) $4_1$ generates an excitation light $Lp_1$. A WDM coupler $3_1$ multiplexes the signal light $L_s$ with the excitation light $Lp_1$ and sends the multiplexed light to a pre-stage erbium doped fiber (EDF) $1_1$. A post-stage EDF $1_2$ is cascaded together with pre-stage EDF $1_1$. An optical isolator $2_2$ is connected to an emission terminal of EDF $1_2$. Wavelength selective reflection type optical devices $6_1$ and $6_2$ are provided at ends of pre-stage EDF $1_1$, where EDF $1_1$ is located at the signal light incidence side in a forward excitation optical amplifier. Thus, wavelength selective reflection type optical devices $6_1$ and $6_2$ and EDF $1_1$ form a fiber resonator type structure as a laser oscillation light generating device. High efficiency in optical amplification of the longer wavelength band is achieved by performing laser oscillation of light of the conventional band in the fiber resonator type structure.

Preferably, EDFs $1_1$ and $1_2$ are ordinary rare earth element doped optical fibers each of which has a core portion doped with a rare earth element which is, for example, erbium ($Er^{3+}$).

Each of optical isolators $2_1$ and $2_2$ has an incidence terminal and an emission terminal and is a passive optical part adapted to provide low loss to a forward light traveling from the incidence side to the emission side and a high loss to a backward light returning from the emission side to the incidence side, thereby allowing light to pass through only in a predetermined direction.

WDM coupler $3_1$ is an optical coupler having input ports which receive signal light $L_s$ and excitation light $L_p$, respectively. WDM coupler $3_1$ multiplexes signal light $L_s$ and excitation light $L_p$ and emits the multiplexed light from an output port.

As an example, an ordinary light source for generating an excitation light having a wavelength band such as the 0.98 $\mu$m band or the 1.48 $\mu$m band is used as excitation light source $4_1$.

As an example, fiber gratings and optical bulk filters and the like can be used as wavelength selective reflection type optical devices $6_1$ and $6_2$. Each of wavelength selective reflection type optical devices $6_1$ and $6_2$ has a required reflection bandwidth. Further, in the case of this embodiment, the center wavelength of the reflection wavelength band is set at 1.55 $\mu$m. The reflectance of each of these wavelength selective reflection type optical devices will be described later.

Next, an operation of the amplifier in FIG. 6 will be described below.

The signal light $L_s$ of the longer wavelength band having entered the amplifier passes through optical isolator $2_1$ and is then multiplexed by WDM coupler $3_1$ with excitation light $Lp_1$ emitted from excitation light source $4_2$. Subsequently, the multiplexed light passes through wavelength selective reflection type optical device $6_1$ and then enters EDF $1_1$. In EDF $1_1$, erbium is excited by excitation light $Lp_1$ having passed through wavelength selective reflection type optical device $6_1$, so that the required degree of population inversion is obtained. Signal light $L_s$ passing through EDF $1_1$ is amplified therein. Moreover, an amplified spontaneous emission (ASE) light of the conventional band is generated in EDF $1_1$. The amplified signal light $L_s$ passes through wavelength selective reflection type optical device $6_2$ and then enters EDF $1_2$. Signal light $L_s$ is then amplified in EDF $1_2$. Thereafter, this amplified signal light $L_s$ is emitted to the outside through optical isolator $2_2$.

With the fiber resonator type structure formed of wavelength selective reflection type optical device $6_1$ and $6_2$ and EDF $1_1$, the light of the conventional band being propagated through EDF $_1$ is selectively reflected by each of wavelength selective reflection type optical devices $6_1$ and $6_2$, and laser oscillation is generated. The light generated by the laser oscillation of the conventional band enters post-stage EDF $1_2$ and thus serves as excitation light. As described above, in EDF$_2$, the light of the conventional band is amplified at a portion having a high degree of population inversion, while such light is absorbed at a portion having a low degree of population inversion and serves as the excitation light. Therefore, the light generated by the laser oscillation of the conventional band can be used as the excitation light by adjusting the degree of population inversion of post-stage EDF $1_2$.

To realize the laser oscillation of light of the conventional band, the reflectance $R_1$ and $R_2$ of wavelength selective reflection type optical devices $6_1$ and $6_2$ and the operational gain $G_1$ of EDF $1_1$ are set in such a manner as to meet the relationship expressed by the following equation. Equation (1):

$$G_1 \cdot (R_1 \cdot R_2)^{1/2} > 1$$

Further, regarding the reflectance $R_1$ and $R_2$ of wavelength selective reflection type optical devices $6_1$ and $6_2$, it is assumed that the reflectance $R_1$ is set at approximate 100% and the reflectance $R_2$ is set to be less than 100% so that the light of the conventional band is output only in the direction of the emission terminal (namely, only to the right in FIG. 6).

Incidentally, the reflection factor $R_2$ can be set at a suitable value being less than 100% according to the optical power of the light of the conventional band needed as the excitation light.

Figure 3:
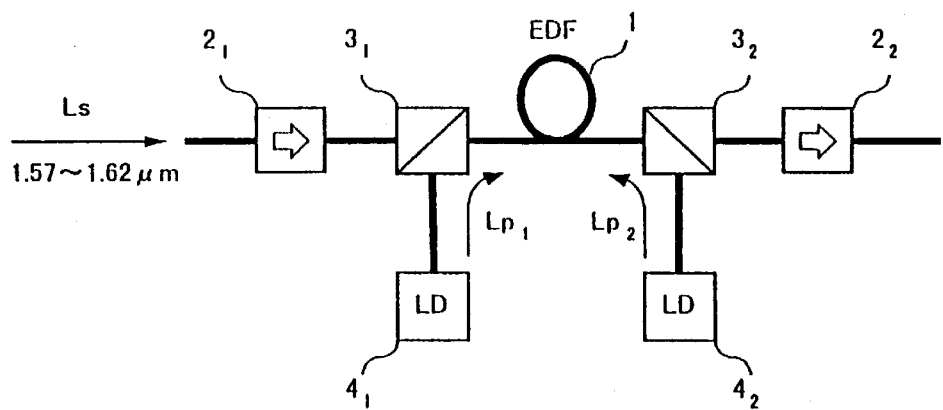
FIG. 3 (prior art) is a diagram showing a conventional long wavelength band optical amplifier.
Figure 4:
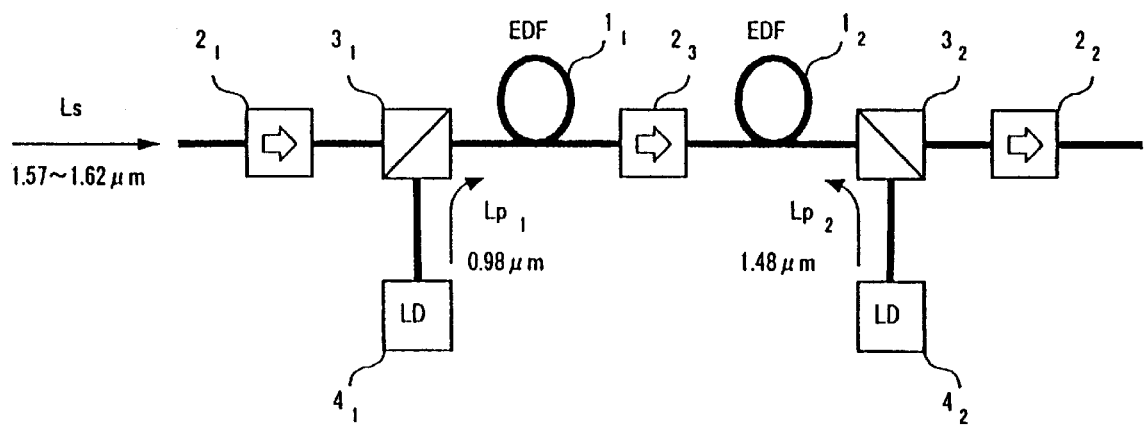
FIG. 4 (prior art) is a diagram showing a conventional long wavelength band optical amplifier.
Figure 5:
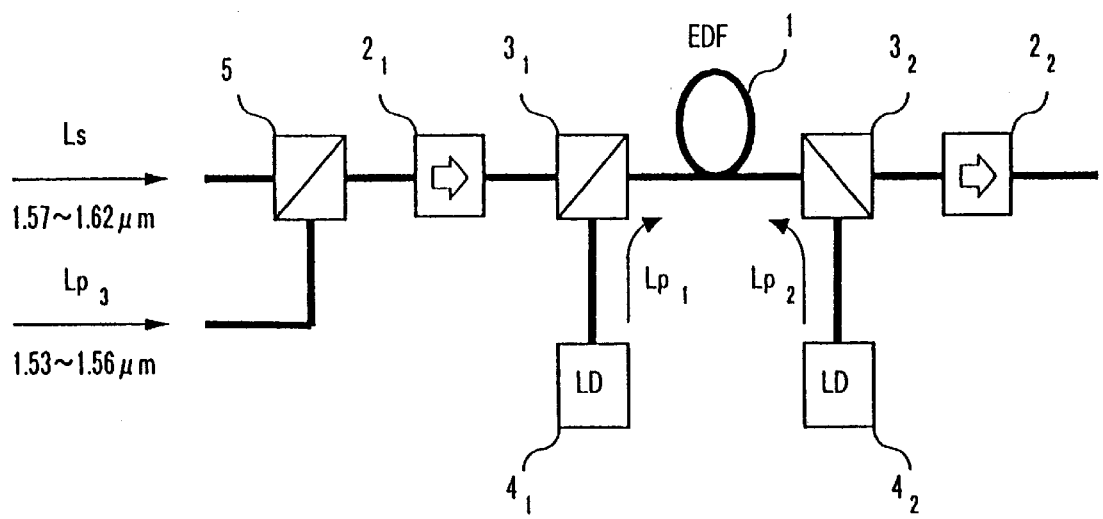
FIG. 5 (prior art) is a diagram showing a conventional long wavelength band optical amplifier.

As described above, a fiber resonator type structure is formed in the pre-stage portion of the optical amplifier so that light of the conventional band being propagated through the pre-stage EDF $1_1$ is oscillated, to generate laser oscillation. Then, light generated by the laser oscillation is supplied to the post-stage EDF $1_2$. Thus, the amplification of the signal light $L_s$ of the longer wavelength band is achieved with high excitation efficiency by adding only inexpensive passive optical parts (namely, wavelength selective reflection type optical devices $6_1$ and $6_2$) without adding active optical parts, such as a light source, to the optical amplifier. This operation is significantly different than the conventional long wavelength band optical amplifiers in FIGS. 3–5. Consequently, the signal light $L_s$ of the longer wavelength band may be amplified by the optical power of excitation light, which is lower than the optical power required by the conventional optical amplifiers. Moreover, reduction in the cost of the optical amplifier is achieved.

As an example, gratings can be written into EDF$_1$ to provide the operation of wavelength selective reflection type optical devices $6_1$ and $6_2$.

Further, although the optical amplifier of the forward excitation type is described above, the present invention is not limited thereto. The present invention may be applied to the optical amplifiers of the backward excitation type and the bi-directional excitation type.

Figure 7:
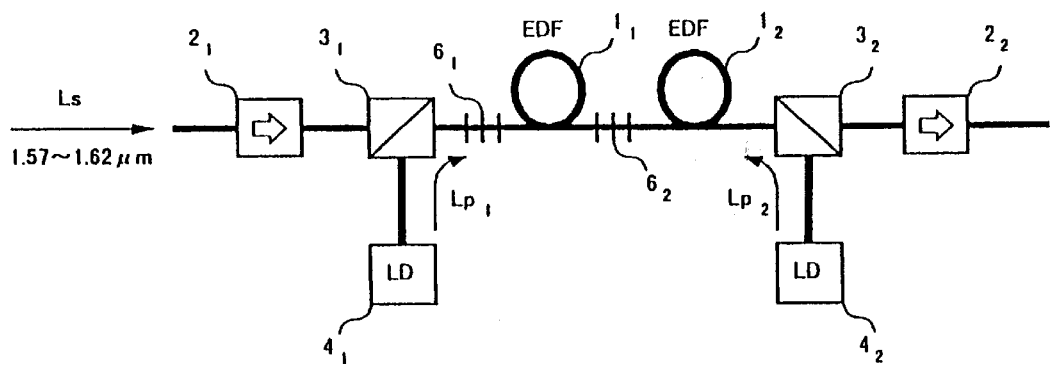
FIG. 7 is a diagram showing an optical amplifier, according to an embodiment of the present invention.

For example, FIG. 7 is a diagram showing an optical amplifier of the bi-directional excitation type, according to an embodiment of the present invention. As shown in FIG. 7, a WDM coupler $3_2$ is inserted between post-stage EDF $1_2$ and optical isolator $2_2$. An excitation light $Lp_2$ generated in an excitation light source $4_2$ is sent to EDF $1_2$ through WDM coupler $3_2$. Backward excitation light $Lp_2$ having entered EDF $1_2$ is propagated through EDFs $1_1$ and $1_2$ in the direction opposite to the direction of propagation of forward excitation light $Lp_1$. For example, the 0.98 µm band and the 1.48 µm band may be employed as the wavelength band of backward excitation light $Lp_2$.

Even in the case of the optical amplifier of the bi-directional excitation type, a fiber resonator type structure is formed of wavelength selective reflection type optical devices $6_1$ and $6_2$, and EDF $1_1$. The light of the conventional band is selectively reflected by each wavelength selective reflection type optical devices $6_1$ and $6_2$, so that laser oscillation is generated. Light generated by the laser oscillation enters post-stage EDF $1_2$ and serves as an excitation light. Consequently, advantageous effects similar to those of in FIG. 6 are obtained. Moreover, high excitation efficiency may be achieved since the optical amplifier is of the bi-directional excitation type.

Figure 8:
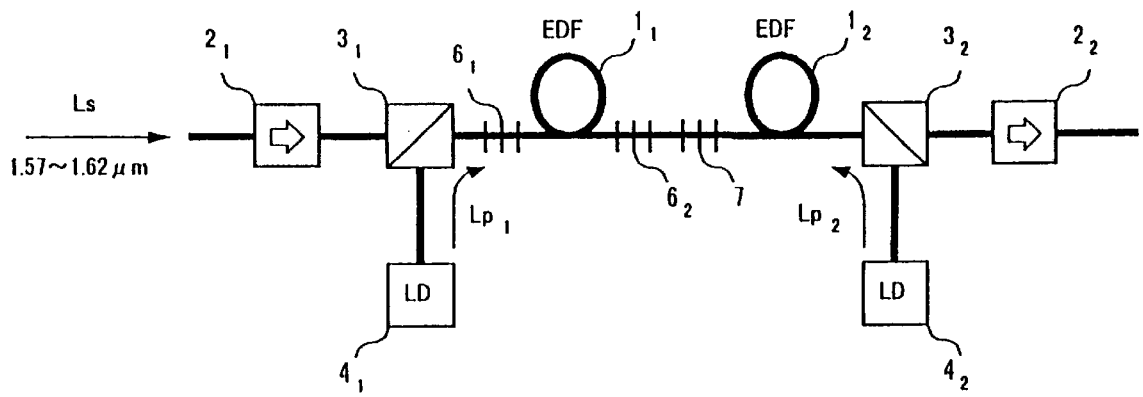
FIG. 8 is a diagram showing an optical amplifier, according to an embodiment of the present invention.

FIG. 8 is a diagram showing an optical amplifier according to an additional embodiment of the present invention. As shown in FIG. 8, an excitation wavelength selective reflection type optical device 7 is inserted between EDFs $1_1$ and $1_2$ as an excitation light reflecting device in, for example, the optical amplifier of the bi-directional excitation type illustrated in FIG. 7.

For example, a fiber grating, an optical bulk filter and the like can be used as excitation wavelength selective reflection type optical device 7. Excitation wavelength selective reflection type optical device 7 is assumed to have characteristics to reflect each of excitation lights $Lp_1$ and $Lp_2$ and to transmit lights of other wavelength bands. In the case where the wavelength band of excitation light $Lp_1$ is different from that of excitation light $Lp_2$, excitation wavelength selective reflection type optical device 7 is set in such a manner as to have two reflection bands respectively corresponding to the excitation wavelength bands. Alternatively, excitation wavelength selective reflection type optical device 7 is set in such a manner as to have one reflection band containing the respective excitation wavelength bands.

In FIG. 8, wavelength selective reflection type optical device $6_2$ and excitation wavelength selective reflection type optical device 7 are provided separately from each other. However, the functions of these devices may be implemented by using a single wavelength selective reflection type optical device. In this case, the optical amplifier employs a wavelength selective reflection type optical device that has a reflection wavelength band of which reflectance is less than 100% in the conventional band, and further has reflection wavelength bands respectively corresponding to the wavelength bands of excitation light $Lp_1$ and excitation light $Lp_2$.

In FIG. 8, signal light $L_s$ of the longer wavelength band having entered in this amplifier passes through optical isolator $2_1$ and is then multiplexed by WDM coupler $3_1$ with excitation light $Lp_1$ emitted from excitation light source $4_1$. Subsequently, the multiplexed light passes through wavelength selective reflection type optical device $6_1$ and then enters EDF $1_1$ to thereby be amplified. Further, signal light $L_s$ of the longer wavelength band having passed through EDF $1_1$ travels through wavelength selective reflection type optical device $6_2$ and excitation wavelength selective reflection type optical device 7 and then enters EDF $1_2$. Excitation light $Lp_2$ emitted from excitation light source $4_2$ is multiplexed at WDM coupler $3_2$ and then is supplied to EDF $1_2$ in a direction opposite to the direction of propagation of signal light $L_s$. Subsequently, signal light $L_s$ is amplified in EDF $1_2$. Thereafter, this amplified signal light $L_s$ having passed through EDF $1_2$ is output to the outside through WDM coupler $3_2$ and optical isolator $2_2$.

Excitation light $Lp_1$, which is propagated from the signal light incidence terminal side in the forward direction, and excitation light $Lp_2$, which is propagated from the signal light emission terminal side in the opposite direction, wavelength-selectively undergo total reflection at excitation wavelength selective reflection type optical device 7 and are then put back into EDFs 11 and $1_2$, respectively. This results in an increase in the conversion efficiencies of excitation lights $Lp_1$, and $Lp_2$ in EDFs $1_1$ and $1_2$, and thus contributes to the high efficiency of an excitation operation. Further, similarly as in the optical amplifier of FIG. 6. the light of the conventional band is selectively reflected by each of wavelength selective reflection type optical devices $6_1$ and $6_2$ with a fiber resonator type structure formed of the wavelength selective reflection type optical devices $6_1$ and $6_2$ and EDF $1_1$, so that laser oscillation is generated. The light of the conventional band is then sent to EDF $1_2$ and serves as an excitation light therefor.

As described above, as shown in FIG. 8, excitation wavelength selective reflection type optical device 7 is provided between EDFs $1_1$ and $1_2$. Thus, the excitation lights $Lp_1$ and $Lp_2$ reciprocate in EDFs $1_1$ and $1_2$, so that the excitation lights are effectively used. Consequently, the excitation efficiency of the optical amplifier is enhanced.

Incidentally, although the optical amplifier of the bi-directional excitation type is shown in FIG. 8, the excitation efficiency is increased by providing an excitation wavelength selective reflection type optical device in an optical amplifier even in the case that the optical amplifier is of the forward or backward excitation type. For example, in the case of the optical amplifier of the forward excitation type shown in FIG. 6, an excitation wavelength selective reflection type optical device may be inserted between EDF $1_2$ and optical isolator $2_2$.

Figure 9:
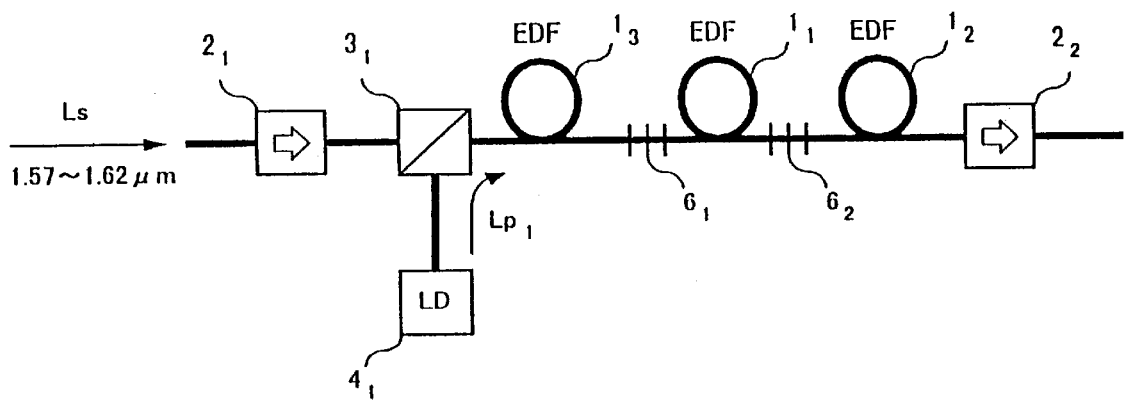
FIG. 9 is a diagram showing an optical amplifier, according to an embodiment of the present invention.

FIG. 9 is a diagram showing an optical amplifier according to a further embodiment of the present invention. As shown in FIG. 9, an EDF $1_3$ is provided between WDM coupler $3_1$ and wavelength selective reflection type optical device $6_1$ with, for example, the optical amplifier of the forward excitation type illustrated in FIG. 6. When amplifying a signal light at a high degree of population inversion, this optical amplifier performs a low-noise operation. More specifically, this optical amplifier realizes a low-noise operation by amplifying a signal light in the vicinity of the signal light incidence terminal thereof at a high degree of population inversion.

Preferably, EDF $1_3$ is an ordinary rare earth element doped fiber which has a core portion doped with a rare earth element, such as erbium, similarly as EDFs $1_1$ and $1_2$.

In FIG. 9, signal light $L_s$ of the longer wavelength band passes through optical isolator $2_1$ and is then multiplexed by WDM coupler $3_1$ with excitation light $Lp_1$ emitted from excitation light source $4_1$. Subsequently, the multiplexed light is enters EDF $1_3$. Because a relatively high power excitation light $Lp_1$ is supplied to EDF $1_3$, the degree of population inversion therein is higher than those of population inversion in post-stage EDFs $1_1$ and $1_2$. When the signal light $L_s$ of the longer wavelength band having passed through EDF $1_3$ of which degree of population inversion is high, the signal light $L_s$ is amplified at a relatively high gain, though the gain flatness is impaired as illustrated in FIG. 1. Then, the amplified signal light $L_s$ and excitation light $Lp_1$ which has not been absorbed in EDF $1_3$, pass through wavelength selective reflection type optical device $6_1$ and then enters EDF $1_1$.

In EDF $1_1$, similarly as in FIG. 6, the signal light $L_s$ is amplified. Moreover, the light of the conventional band is selectively reflected between wavelength selective reflection type optical devices $6_1$ and $6_2$, so that laser oscillation is generated. Subsequently, signal light $L_s$ and the light of the conventional band pass through wavelength selective reflection type optical device $6_2$ and are then sent to EDF $1_2$. Further, excitation light $Lp_1$, which has not been absorbed in EDF $1_1$, passes through wavelength selective reflection type optical device $6_2$ and is sent to EDF $1_2$.

EDF $1_2$ is put into an excited state by the light of the conventional band and excitation light $Lp_1$ at a relatively low degree of population inversion. Signal light $L_s$ is further amplified by EDF $1_2$ and is then emitted to the outside through optical isolator $2_2$.

In this case, signal light $L_s$ of the longer wavelength band is amplified by each of EDFs $1_3$, $1_1$ and $1_2$ which are different in the degree of population inversion from one another. The gain flatness in each of EDFs $1_3$, $1_1$ and $1_2$ is impaired. However, signal light $L_s$ having flat gain characteristics is obtained in the entire optical amplifier by preliminarily setting the optical amplifier so that the average of the degrees of population inversion of EDFs $1_3$, $1_1$ and $1_2$ is about 40%.

As above described, as illustrated in FIG. 9, the optical amplifier has the following advantageous effect in addition to the effects of the optical amplifier in FIG. 6. Namely, because EDF $1_3$, of which degree of population inversion is set at a high level, is provided at a signal light incidence portion of the optical amplifier and thus signal light $L_s$ is effectively amplified at the pre-stage portion where the optical power level is low, the noise is reduced in the entire optical amplifier.

Incidentally, although the optical amplifier of the forward excitation type is shown in FIG. 9, the present invention may be applied to the optical amplifier of the bi-directional excitation type.

Figure 10:
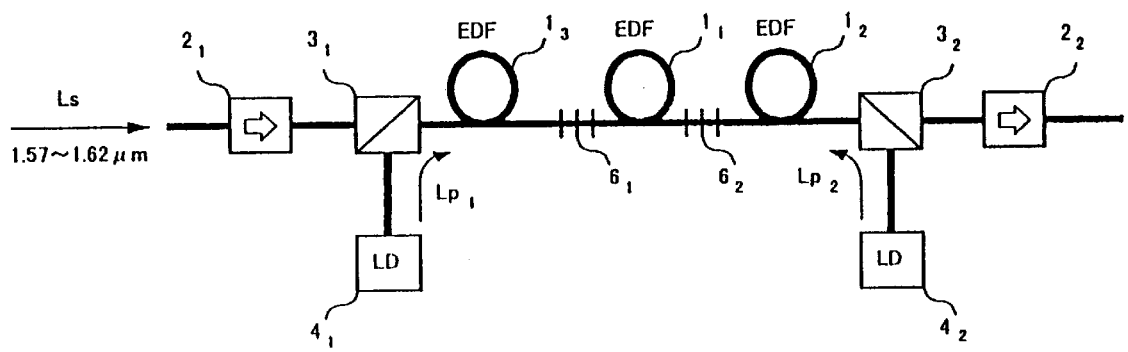
FIG. 10 is a diagram showing an optical amplifier, according to an embodiment of the present invention.

For example, FIG. 10 is a diagram showing an optical amplifier of the bi-directional excitation type, according to an embodiment of the present invention.

Further, similar to the case in FIG. 8, an excitation wavelength selective reflection type optical device for reflecting excitation light may be provided in the optical amplifier of FIGS. 9 or 10.

Figure 11:
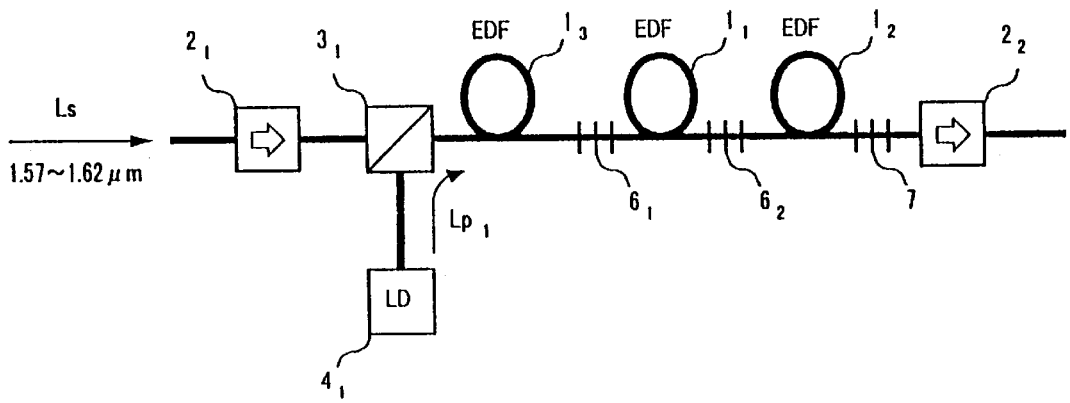
FIG. 11 is a diagram showing an optical amplifier, according to an embodiment of the present invention.

For example, FIG. 11 is a diagram showing an optical amplifier of the forward excitation type, and employing an excitation wavelength selective reflection type optical device 7, according to an embodiment of the present invention. As shown in FIG. 11, in the case of the optical amplifier of the forward excitation type, excitation wavelength selective reflection type optical device 7 may be inserted between EDF $1_2$ and optical isolator $2_2$.

Figure 12:
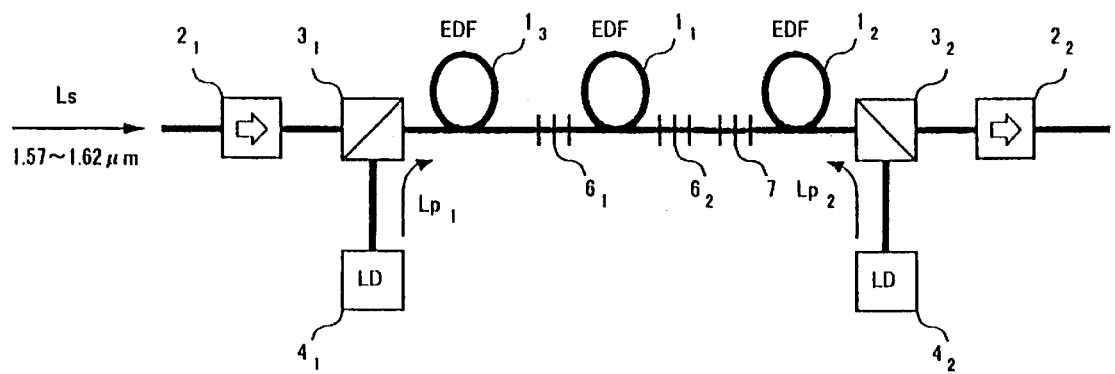
FIG. 12 is a diagram showing an optical amplifier, according to an embodiment of the present invention.

FIG. 12 is a diagram shown an optical amplifier of the bi-directional excitation type, and employing an excitation wavelength selective reflection type optical device 7, according to an embodiment of the present invention. As shown in FIG. 12, in the case of the optical amplifier of the bi-directional excitation type, the excitation wavelength selective reflection type optical device 7 may be inserted between EDF $1_1$ and EDF $1_2$.

Incidentally, in the case of the optical amplifier of the bi-directional excitation type, an excitation wavelength selective reflection type optical device (not shown) may be inserted between EDFs $1_3$ and $1_1$.

Therefore, by providing an excitation wavelength selective reflection type optical device in a bi-direction excitation type optical amplifier, excitation lights $Lp_1$ and $Lp_2$ will be effectively used, and the excitation efficiency will be enhanced.

Figure 13:
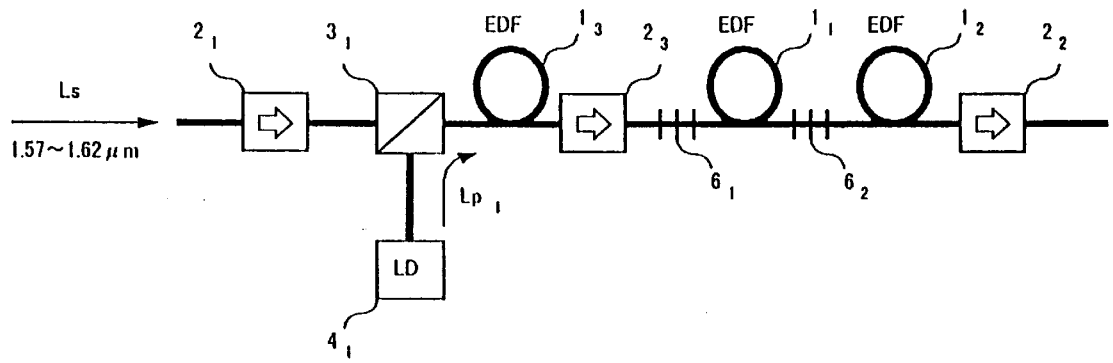
FIG. 13 is a diagram showing an optical amplifier, according to an embodiment of the present invention.

FIG. 13 is a diagram showing an optical amplifier according to a still further embodiment of the present invention. The optical amplifier in FIG. 13 is similar to that in FIG. 9, but includes an optical isolator $2_3$ serving as a light intercepting device between EDF $1_3$ and wavelength selective reflection type optical device $6_1$. The optical amplifier in FIG. 13 realizes a lower noise operation by using optical isolator $2_3$ to intercept spontaneous emission light (ASE) generated in EDF $1_1$ and propagating in a direction opposite to the direction of propagation of signal light $L_s$.

Optical isolator $2_3$ is similar to optical isolators $2_1$ and $2_2$. Optical isolator $2_3$ has characteristics to transmit a light traveling from EDF $1_3$ to EDF $1_1$ and to intercept a light traveling from EDF $1_1$ to EDF $1_3$.

Therefore, in the optical amplifier of FIG. 13, a component propagating in a direction opposite to that of signal light in the spontaneous emission light (ASE) generated in EDF $1_1$ is intercepted by optical isolator $2_3$. Wavelength selective reflection type optical device $6_1$ is provided between EDFs $1_1$ and $1_3$. Thus, the spontaneous emission light having a wavelength within the reflection band is reflected by wavelength selective reflection type optical device $6_1$.

However, the spontaneous emission light having a wavelength outside the reflection band of wavelength selective reflection type optical device $6_1$ is also generated in EDF $1_1$. This spontaneous emission light passes through wavelength selective reflection type optical device $6_1$ and propagates in the direction of EDF $1_3$. When the spontaneous emission light propagating in a direction opposite to this signal light enters EDF $1_3$, the gain corresponding to the light of the longer wavelength band in EDF $1_3$ is lowered. Therefore, the gain of EDF $1_3$ is maintained at a high level by intercepting the spontaneous emission light that passes through wavelength selective reflection type optical device $6_1$ and propagates in the direction opposite to the direction of propagation of the signal light.

As described above, according to an optical amplifier as illustrated in FIG. 13, the gain of signal light $L_s$ in EDF $1_3$ is increased by providing optical isolator $2_3$ in the optical amplifier. Consequently, excellent noise characteristics of the entire optical amplifier are obtained.

Incidentally, although the optical amplifier of the forward excitation type is shown in FIG. 13, optical isolator $2_3$ may be provided between EDF $1_3$ and wavelength selective reflection type optical device $6_1$ even in the case of the optical amplifier of the bi-directional excitation type shown in FIG. 10.

Figure 14:
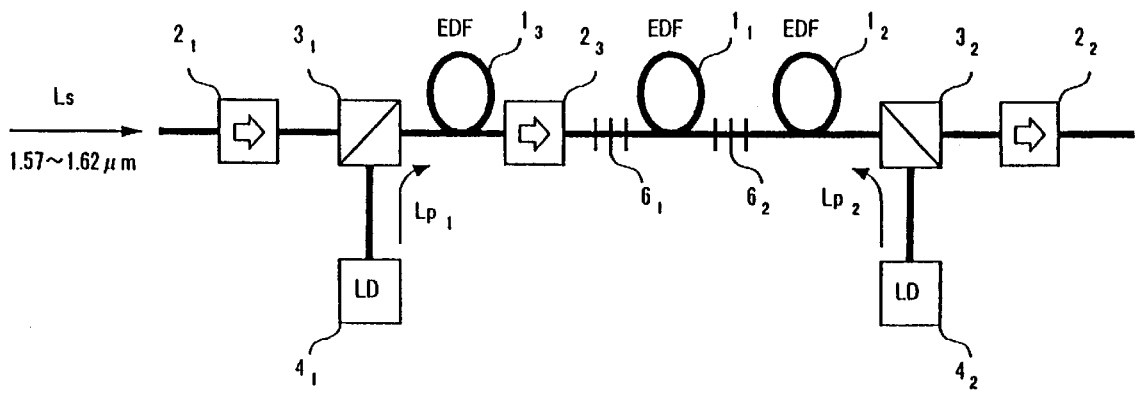
FIG. 14 is a diagram showing an optical amplifier, according to an embodiment of the present invention.

For example, FIG. 14 is a diagram showing an optical amplifier according to another embodiment of the present invention. FIG. 14 illustrates a bi-directional excitation type optical amplifier.

Alternatively, as in FIG. 13, an optical isolator $2_3$ may be provided in an optical amplifier having an excitation wavelength selective reflection type optical device as illustrated in FIGS. 11 or 12.

Figure 15:
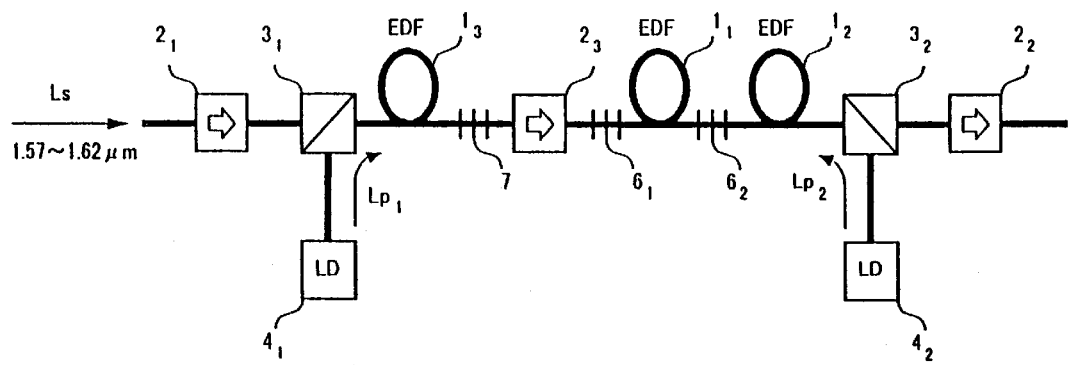
FIG. 15 is a diagram showing an optical amplifier, according to an embodiment of the present invention.

For example, FIG. 15 is a diagram showing an optical amplifier of the bi-directional excitation type, according to an embodiment of the present invention. In FIG. 15, excitation wavelength selective reflection type optical device 7 is provided between EDF $1_3$ and wavelength selective reflection type optical device $6_1$. Furthermore, optical isolator $2_3$ is inserted between excitation wavelength selective reflection type optical device 7 and wavelength selective reflection type optical device $6_1$. In the case of the optical amplifier of the bi-directional excitation type, the insertion position of excitation wavelength selective reflection type optical device 7 may be established between optical isolator $2_3$ and wavelength selective reflection type optical device $6_1$ or between EDFs $1_1$ and $1_2$, in addition to the aforementioned insertion position.

Figure 16:
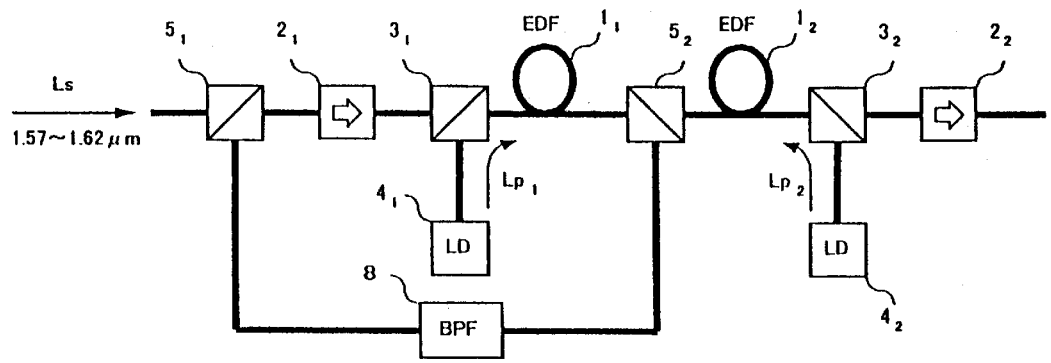
FIG. 16 is a diagram showing an optical amplifier, according to an embodiment of the present invention.

FIG. 16 is a diagram showing an optical amplifier according to an additional embodiment of the present invention. As shown in FIG. 16, the optical amplifier includes multiplexing/demultiplexing devices $5_1$ and $5_2$ and an optical band-pass filter (BPF) 8, instead of wavelength selective reflection type optical devices $6_1$ and $6_2$ in the optical amplifier of the bi-directional excitation type in FIG. 7. The remaining components of the optical amplifier in FIG. 16 are similar to the corresponding components of the optical amplifier in FIG. 7.

Multiplexing/demultiplexing device $5_1$ is connected to, for example, the pre-stage of optical isolator $2_1$ and is operative to multiplex the incident signal light $L_s$ of the longer wavelength band with a light transmitted by BPF 8 and to then emit the multiplexed light to optical isolator $2_1$. Further, multiplexing/demultiplexing device $5_2$ is connected between EDFs $1_1$ and $1_2$ and is operative to bifurcate the light emitted from EDF $1_1$ and to then emit branch lights to EDF $1_2$ and BPF 8. It is assumed that the branching ratio of multiplexing/demultiplexing device $5_2$ is suitably set on the basis of an oscillation condition (to be described later).

BPF 8 is preferably an ordinary optical band-pass filter connected between one of the emission terminals of multiplexing/demultiplexing device $5_2$ and one of the incidence terminals of multiplexing/demultiplexing device $5_1$. BPF 8 has a predetermined pass-band. The center wavelength of the pass-band is set, for example, at 1.55 $\mu$m.

In FIG. 16, multiplexing/demultiplexing device $5_1$ functions as a multiplexing portion. Multiplexing/demultiplexing device $5_2$ serves as a branching portion. BPF 8 acts as a wavelength selecting portion.

In the optical amplifier of FIG. 16, the incident signal light $L_s$ of the longer wavelength band passes through multiplexing/demultiplexing device $5_1$ and optical isolator $2_1$ and is then multiplexed at WDM coupler $3_1$ with excitation light $Lp_1$ sent from excitation light source $4_1$. Subsequently, the multiplexed light enters EDF $1_1$ and is then amplified therein.

Furthermore, the light emitted from EDF $1_1$ is bifurcated by multiplexing/demultiplexing device $5_2$. Then, resultant lights are sent to EDF $1_2$ and BPF 8, respectively. The signal light $L_s$ included in the light sent to EDF $1_2$ is amplified in EDF $1_2$ and then passes through WDM coupler $3_2$ and optical isolator $2_2$ and is subsequently emitted to the outside.

At WDM coupler $3_2$, excitation light $Lp_2$ sent from excitation light source $4_2$ is multiplexed. The multiplexed light $Lp_2$ is supplied to EDF $1_2$ as a backward excitation light.

Therefore, a traveling-wave type optical oscillator (namely, in this example, a fiber ring laser) is comprised of multiplexing/demultiplexing devices $5_1$ and $5_2$, optical isolator $2_1$, WDM coupler $3_1$, EDF $1_1$ and BPF 8. However, in other embodiments, all of these components might not be necessary to form the traveling-wave type optical oscillator. The light of the conventional band included in the light, which is branched by multiplexing/demultiplexing device $5_2$ and is sent to BPF 8, is selected by BPF 8 in this traveling-wave type optical oscillator, so as to generate laser oscillation. Then, light generated by the laser oscillation enters EDF $1_2$ through multiplexing/demultiplexing device $5_2$ and serves as an excitation light for EDF $1_2$.

To realize the aforementioned traveling-wave type laser oscillation of light of the conventional band, a total sum $L_1$ of losses caused at the wavelength of 1.55 $\mu$m in multiplexing/demultiplexing device $5_2$, optical isolator $2_1$ WDM coupler $3_1$ and BPF 8, and the operational gain $G_1$ of EDF $1_1$ at the wavelength of 1.55 $\mu$m meet the following relation expressed by the following inequality. Equation 2:

$$G_1/L_1 > 1$$

As described above, as illustrated in FIG. 16, the amplification of signal light $L_s$ of the longer wavelength band may be achieved with high efficiency by adding only inexpensive passive optical parts to the optical amplifier. Such operation is achieved even if the traveling-wave optical oscillator is provided at the pre-stage portion of the optical amplifier and the light of the conventional band selected in the pass-band of BPF 8 is oscillated to generate laser oscillation, whereby light generated by the laser oscillation is supplied to the post-stage EDF $1_2$. Consequently, a reduction in the cost of the optical amplifier is attained.

Although multiplexing/demultiplexing device $5_1$ is provided at the pre-stage of optical isolator $2_1$ in FIG. 16, multiplexing/demultiplexing device $5_1$ may be placed at an arbitrary position at the pre-stage side of the signal light incidence terminal of EDF $1_1$. In the case where multiplexing/demultiplexing device $5_1$ is provided at the post-stage side of optical isolator $2_1$, an optical isolator for determining the direction of a traveling-wave should be added to a loop including BPF 8.

Figure 17:
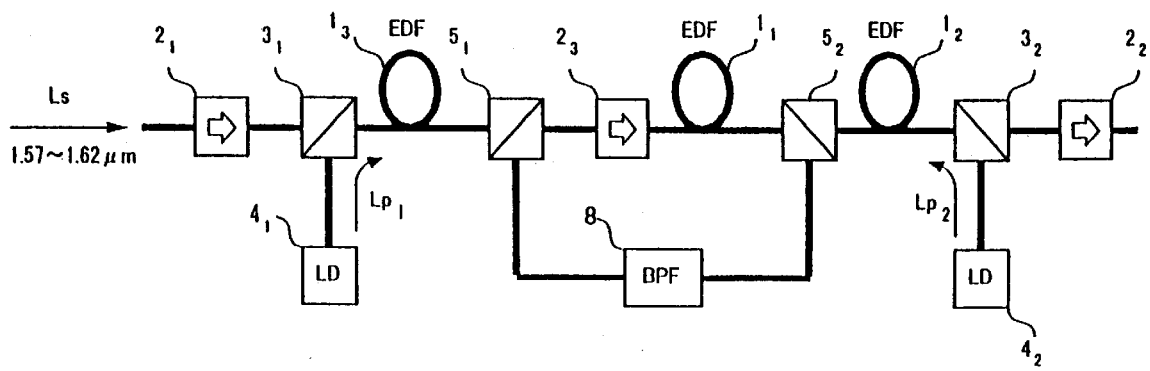
FIG. 17 is a diagram showing an optical amplifier, according to an embodiment of the present invention.

FIG. 17 is a diagram showing an optical amplifier according to a further embodiment of the present invention. As shown in FIG. 17, EDF $1_3$ of which population inversion is set at a high value is provided at the pre-stage of the traveling-wave type optical oscillator of FIG. 16, thereby reducing noise in the optical amplifier.

Practically, the optical amplifier in FIG. 17 is configured as follows. EDF $1_3$ is connected between WDM coupler $3_1$ and EDF $1_1$. Multiplexing/demultiplexing device $5_1$, which was provided at the pre-stage of optical isolator $2_1$ in FIG. 16, is placed between EDFs $1_3$ and $1_1$ in FIG. 17. Further, in FIG. 17, optical isolator $2_3$ is provided between multiplexing/demultiplexing device $5_1$ and EDF $1_1$.

In the optical amplifier of FIG. 17, the incident signal light $L_s$ of the longer wavelength band passes through optical isolator $2_1$ and is then multiplexed at WDM coupler $3_1$ with excitation light $Lp_1$ sent from excitation light source $4_2$. Subsequently, the multiplexed light enters EDF $1_3$. Because a relatively high power excitation light $Lp_1$ is supplied to EDF $1_3$, the degree of population inversion therein is high. When the signal light $L_s$ of the longer wavelength band passes through EDF $1_3$ of which degree of population inversion is high, signal light $L_s$ is amplified at a relatively high gain, though the gain flatness is impaired. Then, the amplified signal light $L_s$ and excitation light $Lp_1$, which has not been absorbed in EDF $1_3$, pass through multiplexing/demultiplexing device $5_1$ and optical isolator $2_3$ and then enter EDF $1_1$.

In EDF $1_1$, similarly as in the case of FIG. 16, signal light $L_s$ is amplified. Moreover, a spontaneous emission light is generated.

Light output from EDF $1$ is bifurcated by multiplexing/demultiplexing device $5_2$. Then, resultant lights are sent to EDF $1_2$ and BPF 8, respectively. Signal light $L_s$ included in the light sent to EDF $1_2$ is amplified in EDF $1_2$. Subsequently, the amplified signal light $L_s$ passes through WDM coupler $3_2$ and optical isolator $2_2$ and is then emitted to the outside.

A traveling-wave type optical oscillator (namely, for example, a fiber ring laser) is formed of multiplexing/demultiplexing devices $5_1$ and $5_2$, optical isolator $3_{23}$, EDF $1_1$ and BPF 8. The light of the conventional band included in the light, which is branched by multiplexing/demultiplexing device $5_2$ and is sent to BPF 8, is selected by BPF 8 in this traveling-wave type optical oscillator, so that laser oscillation is generated. Then, a part of the light generated by the laser oscillation of the conventional band enters EDF $1_2$ through multiplexing/demultiplexing device $5_2$ and serves as an excitation light for EDF $1_2$. Optical isolator $2_3$ has the functions of limiting the direction of propagation of light of the conventional band only to one direction to thereby make such light as a traveling wave, and preventing the light of the conventional band from entering EDF $1_3$.

The total sum $L_2$ of losses caused at the wavelength of 1.55 $\mu$m in multiplexing/demultiplexing devices $5_1$ and $5_2$, optical isolator $2_3$ and BPF 8, and the operational gain $G_1$ of EDF $1_1$ at the wavelength of 1.55 $\mu$m meet the oscillation condition expressed by the following inequality. Equation (3):

$$G_1/L_2 > 1$$

As described above, as in FIG. 17, in an optical amplifier having a traveling-wave type optical oscillator, the signal light $L_s$ of the longer wavelength band is effectively amplified at the pre-stage portion, in which the optical power level is low, by providing EDF $1_3$, of which degree of population inversion is set at a high value, at the signal light incidence portion of the optical amplifier. Thus, noise is reduced in the entire optical amplifier to low levels.

Although the optical amplifier of the bi-directional excitation type is shown in FIGS. 16 and 17, the present invention is not limited thereto. The present invention may be applied to an optical amplifier of the forward excitation type from which excitation light source $4_2$ and WDM coupler $3_2$ are removed.

Further, although an optical amplifier as in FIG. 17 has multiplexing/demultiplexing device $5_2$ and BPF 8 and is adapted so that the light of the conventional band included in the branch light sent from multiplexing/demultiplexing device $5_2$ is selected by BPF 8, a multiplexing/demultiplexing device having a wavelength selecting function may be used instead of multiplexing/demultiplexing device $5_2$ and BPF 8. More specifically, an optical part having the function of selectively branching a part of a component of the conventional band included in the light sent from EDF $1_1$, may be used instead of multiplexing/demultiplexing device $5_2$ and BPF 8.

An optical amplifier adapted to receive a light obtained by multiplexing a signal light of the conventional band and a signal light of the longer wavelength band, to amplify these signal lights and to emit the multiplexed light, will be described below.

Figure 18:
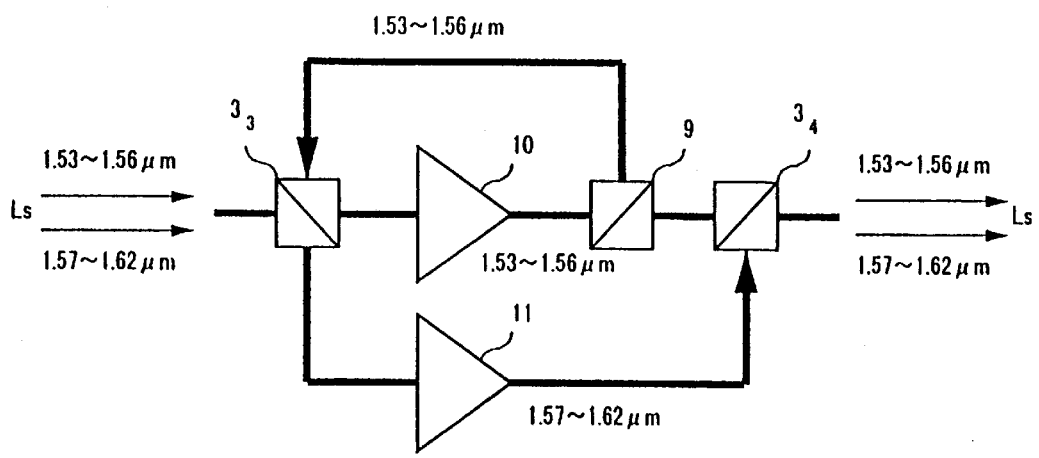
FIG. 18 is a diagram showing an optical amplifier, according to an embodiment of the present invention.

For example, FIG. 18 is a diagram showing an optical amplifier according to an additional embodiment of the present invention. As shown in FIG. 18, signal light $L_s$ obtained by multiplexing lights of two wavelength bands, such as the conventional band and the longer wavelength band, enters WDM coupler $3_3$. An optical amplifying portion 10 serves as a first optical amplifying device for amplifying a light of the conventional band. An optical amplifying portion 11 serves as a second optical amplifying device for amplifying a light of the longer wavelength band. A branching coupler 9 serves as a light branching device for bifurcating a light emitted from optical amplifying portion 10. A WDM coupler $3_4$ serves as a branch light supplying device for multiplexing a light emitted from optical amplifying portion 11 with one of branch lights received from branching coupler 9. It is assumed herein that the direction of propagation of the signal light of the conventional band is the same as that of propagation of the signal light of the longer wavelength band.

WDM coupler $3_3$ has at least two input ports and two output ports. Signal light $L_s$ obtained by multiplexing a light of the conventional band with a light of the longer wavelength band enters in one of the input ports. Signal light $L_s$ is demultiplexed in accordance with wavelength bands. More specifically, the light of the conventional band is emitted from an output port of WDM coupler $3_3$ connected to optical amplifying portion 10. The light of the longer wavelength band is emitted from an output port of WDM coupler $3_3$ connected to optical amplifying portion 11. Furthermore, one of branch lights obtained by bifurcating the signal light at branching coupler 9 enters an input port of WDM coupler $3_3$. The light of the conventional band included in this branch light is emitted from an output port of WDM coupler $3_3$ to optical amplifying portion 11.

Optical amplifying portion 10 is, for example, an ordinary optical amplifier for amplifying a light of the conventional band. More practically, optical amplifying portion 10 is, for example, the optical amplifier of FIGS. 3 or 4. Further, the conventional band is preferably set as the optical amplification band of such an optical amplifier.

Optical amplifying portion 11 is, for example, an optical amplifier for amplifying a light of the longer wavelength band. More practically, optical amplifying portion 11 is, for example, the optical amplifier used in any of the above embodiments of the present invention, or a conventional long wavelength optical amplifier illustrated, for example, in FIGS. 3 or 4.

Branching coupler 9 is operative to branch a light emitted from optical amplifying portion 10 (mainly, amplified signal light of the conventional band) at a previously set branching ratio into two branch light beams, and to send one of the branch lights to an input port of WDM coupler $3_4$, and to put back the other of the branch lights to an input port of WDM coupler $3_3$.

WDM coupler $3_4$ has at least two input ports and one output port. The branch light from branching coupler 9 enters in one of the input ports and the light emitted from optical amplifying portion 11 (mainly, amplified signal light of the 1.58 μm) enters in the other of the input ports. The lights entered in the input ports are multiplexed and then emitted to the outside. WDM couplers $3_3$ and $3_4$ are known devices and include, for example, a dielectric filter and a WDM fiber coupler.

When the signal light $L_s$ obtained by multiplexing lights of two wavelength bands enters the optical amplifier of FIG. 18, the signal light $L_s$ is demultiplexed by WDM coupler $3_3$ into lights of the respective wavelength bands. These lights are sent to optical amplifying portions 10 and 11 respectively corresponding to the wavelength bands thereof to thereby be amplified. The light of the conventional band is bifurcated at branching coupler 9 into two branch lights after being emitted from optical amplifying portion 10. One of the branch lights is emitted to the outside through WDM coupler $3_4$. Further, the other of the branch lights is put back to WDM coupler $3_3$. Then, a component of the conventional band enters in optical amplifying portion 11 through WDM coupler $3_3$.

Thus, the signal light of the longer wavelength band and a part of the light of the conventional band, which has been amplified by optical amplifying portion 10, are input to optical amplifying portion 11 through WDM coupler $3_3$. Consequently, the light of the conventional band serves as an excitation light for the optical amplification of the longer wavelength band. The amplification of the signal light of the longer wavelength band is performed with high excitation efficiency. This amplified signal light of the longer wavelength band is multiplexed at WDM coupler $3_4$ with the signal light of the conventional band and is then emitted to the outside.

As described above, as in FIG. 18, in the case of collectively amplifying the signal light of the conventional band and the signal light of the longer wavelength band, a part of the light of the conventional band is branched by branching coupler 9. Then, the branched part is supplied to optical amplifying portion 11 through WDM coupler $3_3$. Thus, the light of the conventional band acts as the excitation light for the optical amplification of the light of the longer wavelength band. Consequently, the excitation efficiency of the optical amplification of the light of the longer wavelength band is enhanced. Further, only passive optical parts are required to supply the light of the conventional band to the optical amplifying portion 11 for amplifying the light of the longer wavelength band.

Thus, the present invention provides an optical amplifier having excellent amplification characteristics at a low cost. Such an optical amplifier is very useful as an optical amplifying repeater for use, especially, in a superwideband amplifying repeater transmission system for transmission of light of a superwideband obtained by multiplexing lights of the conventional wavelength band and the longer wavelength band.

Therefore, as illustrated in FIG. 18, an optical amplifier includes first and second optical amplifiers amplifying first and second signal lights, respectively, the first and second signal lights being in different wavelength bands. An excitation light providing device (such as, for example, WDM couplers $3_3$ and $3_4$) branches a portion of the signal light amplified by the first optical amplifier, and provides the branched portion to the second optical amplifier as excitation light in the second optical amplifier.

Figure 19:
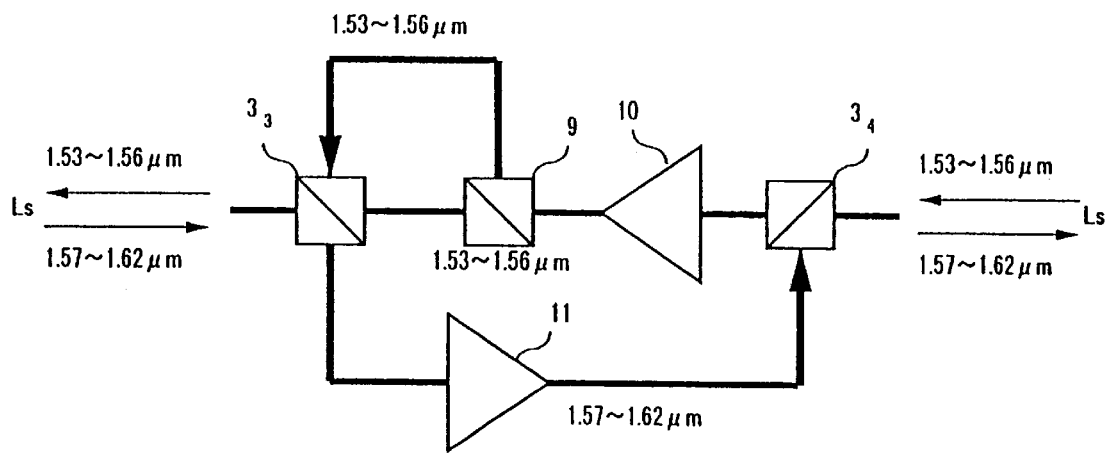
FIG. 19 is a diagram showing an optical amplifier, according to an embodiment of the present invention.

FIG. 19 is a diagram showing an optical amplifier according to an additional embodiment of the present invention. More specifically, FIG. 19 shows an optical amplifier which collectively amplifies a signal light of the conventional band and a signal light of the longer wavelength band traveling in different directions of transmission from each other. As compared to FIG. 18, the optical amplifier in FIG. 19 inverts the input and output directions of optical amplifying portion 10 and changes the placement of branching coupler 9 in such a way as to be located between the output terminal of optical amplifying portion 10 and WDM coupler $3_3$, in the case where the signal light $L_s$ of the conventional band is transmitted, for example, to the left, as viewed in this figure, and the signal light of the longer wavelength band is transmitted to the right.

In the optical amplifier of FIG. 19, the signal light of the conventional band enters optical amplifying portion 10 through WDM coupler $3_4$. Then, the incident signal light is amplified therein. Subsequently, the light emitted from optical amplifying portion 10 is branched at branching coupler 9 into two branch lights. One of the branch lights is emitted to the outside through WDM coupler $3_3$. The other branch light is sent to optical amplifying portion 11 through WDM coupler $3_3$, and serves as an excitation light. The signal light $L_s$ of the longer wavelength band enters optical amplifying portion 11 through WDM coupler $3_3$. Then, this incident signal light is amplified with high excitation efficiency. Finally, the amplified signal light is emitted to the outside through WDM coupler $3_4$.

Thus, the optical amplifier in FIG. 19 obtains advantageous effects similar to those of the optical amplifier in FIG. 18 even in the case that the transmission direction of the signal light of the conventional band is different from that of the signal light of the longer wavelength band.

FIGS. 18 and 19 show optical amplifiers which amplify lights in two different wavelength bands. In these figures, the wavelength bands are described as being, for example, the conventional band and the longer wavelength band. However, these wavelength bands are only intended to be examples, and the embodiments of the present invention are applicable to other wavelength bands.

Although the above embodiments employ EDFs as the rare earth element doped fibers, the embodiments of the present invention are not limited thereto. For example, optical fiber doped with a rare earth element other than erbium may be used. Further, in the foregoing descriptions, the case of using the new wavelength transmission band as the longer wavelength band, and of utilizing the light of the conventional band to increase the efficiency of optical amplification as the excitation light, has been described. However, the new transmission band and the wavelength band of light to be utilized as the excitation light according to the embodiments of the present invention are not limited thereto. More specifically, other wavelength bands can be used.

The above embodiments of the present invention provide a low-cost optical amplifier and optical amplification method which achieve high excitation efficiency in amplifying signal light (such as that, for example, in the longer wavelength band). The optical amplifier and optical amplification method can be achieved by adding only passive optical parts to a conventional optical amplifier. Therefore, for example, highly efficient optical amplification of signal light of the longer wavelength band can be realized.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus comprising:
    a first optical fiber doped with a rare earth element and supplied with an excitation light, spontaneous emission lights being generated in the first optical fiber;
    a second optical fiber doped with a rare earth element; and
    an oscillation generator causing the spontaneous emission lights to oscillate in the first optical fiber, and supplying light generated by the oscillation of the spontaneous emission lights to the second optical fiber as excitation light in the second optical fiber.

2. An apparatus as in claim 1, further comprising:
    a light source supplying excitation light to the second optical fiber, the excitation light supplied by the light source being different that the light generated by the oscillation of the spontaneous emission lights and supplied to the second optical fiber as excitation light.

3. An apparatus as in claim 1, wherein
    a signal light travels through the first optical fiber and then through the second optical fiber,
    the excitation light and the oscillating spontaneous emission lights in the first optical fiber cause the signal light to be amplified as the signal light travels through the first optical fiber, and
    the light generated by the oscillation of the spontaneous emission lights and supplied to the second optical fiber causes the signal light to be amplified as the signal light travels through the second optical fiber.

4. An apparatus as in claim 1, wherein the oscillation generator comprises:
    reflectors at different points along the first optical fiber and which reflect spontaneous emission light at a predetermined wavelength, the reflectors causing spontaneous emission lights to oscillate in the first optical fiber.

5. An apparatus as in claim 4, wherein the reflectors are fiber gratings.

6. An apparatus as in claim 1, wherein
    a signal light travels through the first optical fiber from a first end to a second end of the first optical fiber, and then through the second optical fiber,
    the oscillation generator includes a first reflector at the first end of the first optical fiber and a second reflector at the second end of the first optical fiber, the first and second reflectors reflecting spontaneous emission light at a predetermined wavelength so that spontaneous emission lights oscillate in the first optical fiber between the first and second reflectors.

7. An apparatus as in claim 6, wherein the first and second reflectors are fiber gratings.

8. An apparatus as in claim 6, wherein the first reflector is a fiber grating having approximately 100% reflectance for spontaneous emission light at the predetermined wavelength, and the second reflector is a fiber grating having less than 100% reflectance for spontaneous emission light at the predetermined wavelength.

9. An apparatus as in claim 8, wherein the first and second reflectors are fiber gratings.

10. An apparatus as in claim 6, wherein
    a signal light travels through the first optical fiber from a first point to a second point along the first optical fiber, and then through the second optical fiber, and
    the oscillation generator includes
        a first fiber grating positioned at the first point and having approximately 100% reflectance for spontaneous emission light at the predetermined wavelength, and
        a second fiber grating positioned at the second point and having less than 100% reflectance for spontaneous emission light at the predetermined wavelength, the first and second fiber gratings causing spontaneous emission lights to oscillate in the first optical fiber between the first and second fiber gratings, the light generated by the oscillation of the spontaneous emission lights passing through the second fiber grating into the second optical fiber.

11. An apparatus as in claim 1, wherein the excitation light supplied to the first optical fiber is forward excitation light.

12. An apparatus as in claim 1, wherein the excitation light supplied to the first optical fiber is bi-directional excitation light.

13. An apparatus as in claim 1, wherein
the excitation light supplied to the first optical fiber is bi-directional excitation light, and
the second optical fiber is provided with bi-directional excitation light, in addition to the light generated by the oscillation of the spontaneous emission lights and supplied to the second optical fiber as excitation light.

14. As apparatus as in claim 1, wherein
the first and second optical fibers each have first and second ends,
light travels through the first optical fiber from the first end to the second end of the first optical fiber, and then through the second optical fiber from the first end to the second end of the second optical fiber,
the apparatus further comprises
a first light source providing excitation light to the first end of the first optical fiber, and
a second light source providing excitation light to the second end of the second optical fiber, so that the first and second light sources together provide bi-directional excitation light to both the first and second optical fibers.

15. An apparatus as in claim 1, wherein
a signal light travels through the first optical fiber from a first end to a second end of the first optical fiber, and then through the second optical fiber,
the apparatus further comprising
a light source providing the excitation light to one of the first and second ends of the first optical fiber, and
an excitation light reflector at the other of said one of the first and second ends of the first optical fiber, the excitation light reflector reflecting excitation light back into the first optical fiber and passing the signal light.

16. An apparatus as in claim 1, wherein
a signal light travels through the first optical fiber from a first end to a second end of the first optical fiber, and then through the second optical fiber,
the apparatus further comprising
a light source providing the excitation light to the first end of the first optical fiber as forward excitation light, and
an excitation light reflector at the second end of the first optical fiber, the forward excitation light traveling through the first optical fiber and out the second end of the first optical fiber, and being reflected back into the first optical fiber through the second end by the excitation light reflector.

17. An apparatus as in claim 1, wherein
signal light travels from the first optical fiber to the second optical fiber,
the excitation light supplied to the first optical fiber is bi-directional excitation light,
the second optical fiber is provided with bi-directional excitation light, in addition to the light generated by the oscillation of the spontaneous emission lights and supplied to the second optical fiber as excitation light, and
the apparatus further comprises an excitation light reflector optically connected between the first and second optical fibers, the excitation light reflector reflecting forward excitation light traveling out of the first optical fiber back into the first optical fiber, reflecting backward excitation light traveling out of the second optical fiber back into the second optical fiber, and passing signal light from the first optical fiber to the second optical fiber.

18. An apparatus as in claim 17, wherein the excitation light reflector is a fiber grating.

19. An apparatus as in claim 1, further comprising:
a third optical fiber doped with a rare earth element and optically connected to the first and second optical fibers so that light travels through the third optical fiber, then through the first optical fiber, and then through the second optical fiber.

20. An apparatus as in claim 16, further comprising:
a third optical fiber doped with a rare earth element and optically connected to the first and second optical fibers so that light travels through the third optical fiber, then through the first optical fiber, and then through the second optical fiber.

21. An apparatus as in claim 19, further comprising:
a light intercepting device intercepting light traveling from the first optical fiber to the third optical fiber.

22. An apparatus as in claim 20, further comprising:
a light intercepting device intercepting light traveling from the first optical fiber to the third optical fiber.

23. An apparatus as in claim 21, wherein the light intercepting device is an optical isolator.

24. An apparatus as in claim 1, wherein
a signal light travels through the first optical fiber and then through the second optical fiber, the signal light being in a wavelength band from 1.57 to 1.62 $\mu$m, and
the spontaneous emission lights are in a wavelength band from 1.53 to 1.57 $\mu$m.

25. An apparatus as in claim 1, wherein
a signal light travels through the first optical fiber and then through the second optical fiber, the signal light being in a wavelength band from 1.57 to 1.62 $\mu$m,
the spontaneous emission lights are in a wavelength band from 1.53 to 1.57 $\mu$m,
the excitation light and the oscillating spontaneous emission lights in the first optical fiber cause the signal light to be amplified as the signal light travels through the first optical fiber, and
the signal light is amplified as the signal light travels through the second optical fiber.

26. An apparatus as in claim 1, wherein the oscillation generator is a traveling-wave type optical oscillator.

27. An apparatus as in claim 1, wherein
the first and second optical fibers each have first and second ends,
light travels through the first optical fiber from the first end to the second end of the first optical fiber, and then through the second optical fiber from the first end to the second end of the second optical fiber,
the oscillation generator is a traveling-wave type optical oscillator comprising
a branching device branching a portion of light traveling out of the second end of the second optical fiber,
a wavelength selection device selecting spontaneous emission light of a predetermined wavelength band from said branched portion, the selected spontaneous emission light being provided to the first optical fiber through the first end of the first optical fiber.

28. An apparatus as in claim 1, wherein the oscillation of the spontaneous emission lights in the first optical fiber generates laser oscillation, and the light generated by the oscillation of the spontaneous emission lights and supplied to the second optical fiber is light generated by the laser oscillation.

29. An apparatus comprising:
first and second optical fibers each doped with a rare earth element and optically connected so that a signal light travels through the first optical fiber and then through the second optical fiber;
at least one light source providing excitation light to the first and second optical fibers so that the signal light is amplified in both the first and second optical fibers, spontaneous emission lights being generated in the first optical fiber; and
an oscillation generator causing the spontaneous emission lights to oscillate in the first optical fiber, and supplying light generated by the oscillation of the spontaneous emission lights to the second optical fiber as excitation light in the second optical fiber.

30. An apparatus as in claim 29, wherein the oscillation generator comprises:
reflectors at different positions along the first optical fiber and which reflect spontaneous emission light at a predetermined wavelength, the reflectors causing spontaneous emission lights to oscillate between the reflectors in the first optical fiber.

31. An apparatus as in claim 30, wherein the reflectors are fiber gratings.

32. An apparatus as in claim 29, wherein
the signal light travels through the first optical fiber from a first point to a second point along the first optical fiber, and then through the second optical fiber,
the oscillation generator includes a first reflector at the first point and a second reflector at the second point, the first and second reflectors reflecting spontaneous emission light at a predetermined wavelength so that spontaneous emission lights oscillate in the first optical fiber between the first and second reflectors.

33. An apparatus as in claim 32, wherein the first and second reflectors are fiber gratings.

34. An apparatus as in claim 32, wherein the first reflector is a fiber grating having approximately 100% reflectance for spontaneous emission light at the predetermined wavelength, and the second reflector is a fiber grating having less than 100% reflectance for spontaneous emission light at the predetermined wavelength so that the light generated by the oscillation of the spontaneous emission lights passes through the second reflector into the second optical fiber.

35. An apparatus as in claim 29, wherein
a signal light travels through the first optical fiber and then through the second optical fiber, the signal light being in a wavelength band from 1.57 to 1.62 $\mu$m, and
the spontaneous emission lights are in a wavelength band from 1.53 to 1.57 $\mu$m.

36. An apparatus as in claim 29, wherein the oscillation of the spontaneous emission lights in the first optical fiber generates laser oscillation, and the light generated by the oscillation of the spontaneous emission lights and supplied to the second optical fiber is light generated by the laser oscillation.

37. An optical amplifier comprising:
a first amplification stage amplifying a signal light and generating spontaneous emission lights as the signal light is amplified;
a second amplification stage amplifying the signal light after being amplified by the first amplification stage; and an oscillation generator causing the spontaneous emission lights to oscillate in the first amplification stage and thereby generate laser oscillation, and causing light generated by the laser oscillation to be supplied to the second amplification stage for amplification of the signal light in the second amplification stage.

38. An apparatus comprising:
a first optical fiber doped with a rare earth element and supplied with an excitation light so that spontaneous emission lights are generated in the first optical fiber;
a second optical fiber doped with a rare earth element; and
means for causing the spontaneous emission lights to oscillate in the first optical fiber, and for supplying light generated by the oscillation of the spontaneous emission lights to the second optical fiber as excitation light in the second optical fiber.

39. A method comprising:
causing a signal light to travel through a first optical fiber and then through a second optical fiber, the first and second optical fibers each doped with a rare earth element,
providing excitation light to the first and second optical fibers so that the signal light is amplified in both the first and second optical fibers, spontaneous emission lights being generated in the first optical fiber;
causing the spontaneous emission lights to oscillate in the first optical fiber; and
supplying light generated by the oscillation of the spontaneous emission lights to the second optical fiber as excitation light in the second optical fiber.

40. A method as in claim 39, wherein the oscillation of the spontaneous emission lights in the first optical fiber generates laser oscillation, and the light generated by the oscillation of the spontaneous emission lights and supplied to the second optical fiber is light generated by the laser oscillation.

41. An apparatus for amplifying a signal light, comprising:
an optical fiber doped with a rare earth element and provided with excitation light so that the signal light is amplified as the signal light travels through the optical fiber, thereby generating spontaneous emission light in the optical fiber; and
an oscillation generator causing the spontaneous emission light to oscillate in the optical fiber, wherein the signal light is in a signal light wavelength band, the excitation light is in an excitation light wavelength band, and the spontaneous emission light is in a wavelength band which is outside of the signal light wavelength band and the excitation light wavelength band.

42. An apparatus as in claim 41, wherein the oscillation generator comprises:
reflectors at ends of the optical fiber and which reflect spontaneous emission light at a predetermined wavelength, the reflectors causing spontaneous emission light to oscillate between the reflectors in the first optical fiber.

43. An apparatus as in claim 42, wherein the reflectors are fiber gratings.

44. An apparatus as in claim 41, wherein the oscillation generator is a traveling-wave type optical oscillator.

45. An apparatus as in claim 41, wherein
the optical fiber has first and second ends,
the signal light travels through the optical fiber from the first end to the second end, and the oscillation generator is a traveling-wave type optical oscillator comprising
- a branching device branching a portion of light traveling out of the second end of the optical fiber,
- a wavelength selection device selecting spontaneous emission light of a predetermined wavelength band from said branched portion, the selected spontaneous emission light being provided to the optical fiber through the first end of the optical fiber.

46. An apparatus as in claim 41, wherein the oscillation of the spontaneous emission light in the optical fiber generates laser oscillation.

47. A method comprising:
providing an optical fiber doped with a rare earth element;
provided excitation light to the optical fiber so that a signal light is amplified as the signal light travels through the optical fiber, thereby generating spontaneous emission light in the optical fiber; and
causing the spontaneous emission light to oscillate in the optical fiber, wherein the signal light is in a signal light wavelength band, the excitation light is in an excitation light wavelength band, and the spontaneous emission light is in a wavelength band which is outside of the signal light wavelength band and the excitation light wavelength band.

48. An apparatus for amplifying a signal light, comprising:
an optical fiber doped with a rare earth element and provided with excitation light so that the signal light is amplified as the signal light travels through the optical fiber, thereby generating spontaneous emission light in the optical fiber; and
an oscillation generator causing the spontaneous emission light to oscillate in the optical fiber, wherein
the optical fiber has first and second ends,
the signal light travels through the optical fiber from the first end to the second end, and
the oscillation generator is a traveling-wave type optical oscillator comprising
- a branching device branching a portion of light traveling out of the second end of the optical fiber, and
- a wavelength selection device selecting spontaneous emission light of a predetermined wavelength band from said branched portion, the selected spontaneous emission light being provided to the optical fiber through the first end of the optical fiber.

* * * * *